United States Patent [19]

Ogawa et al.

[11] Patent Number: 5,245,373
[45] Date of Patent: Sep. 14, 1993

[54] DATA IMPRINTING DEVICE FOR CAMERA

[75] Inventors: Yukio Ogawa; Daisuke Sahori; Kiyoshi Alyfuku, all of Yokohama, Japan

[73] Assignee: Canon Kabushiki Kaisha, Tokyo, Japan

[21] Appl. No.: 931,513

[22] Filed: Aug. 21, 1992

Related U.S. Application Data

[63] Continuation of Ser. No. 681,649, Apr. 8, 1991, abandoned, which is a continuation of Ser. No. 579,099, Sep. 7, 1990, abandoned, which is a continuation of Ser. No. 481,700, Feb. 20, 1990, abandoned, which is a continuation of Ser. No. 384,106, Jul. 21, 1989, abandoned, which is a continuation of Ser. No. 242,436, Sep. 2, 1988, abandoned, which is a continuation-in-part of Ser. No. 74,228, Jul. 16, 1987, abandoned.

[30] Foreign Application Priority Data

| Jul. 22, 1986 | [JP] | Japan | 61-172583 |
| Dec. 2, 1986 | [JP] | Japan | 61-286013 |
| Dec. 2, 1986 | [JP] | Japan | 61-286014 |
| Dec. 5, 1986 | [JP] | Japan | 61-288737 |
| Sep. 2, 1987 | [JP] | Japan | 62-219658 |

[51] Int. Cl.$^5$ ............................................. G03B 17/24
[52] U.S. Cl. ..................................... 354/106; 354/159
[58] Field of Search ................ 354/105, 106, 109, 159

[56] References Cited

U.S. PATENT DOCUMENTS

| 1,848,814 | 3/1932 | Allen | 354/106 |
| 4,384,771 | 5/1983 | Sakurada et al. | 354/105 |
| 4,583,831 | 4/1986 | Harvey | 354/106 |
| 4,702,580 | 10/1987 | Denner | 354/106 |
| 4,860,039 | 8/1989 | Hata et al. | 354/106 |
| 4,926,203 | 5/1990 | Hata et al. | 354/106 |

Primary Examiner—David M. Gray
Attorney, Agent, or Firm—Fitzpatrick, Cella, Harper & Scinto

[57] ABSTRACT

A data imprinting device for a camera of the kind permitting change-over from one photo-taking image plane size to another is arranged to vary the size and/or position of imprinting data according to the change-over of the image plane size.

83 Claims, 17 Drawing Sheets

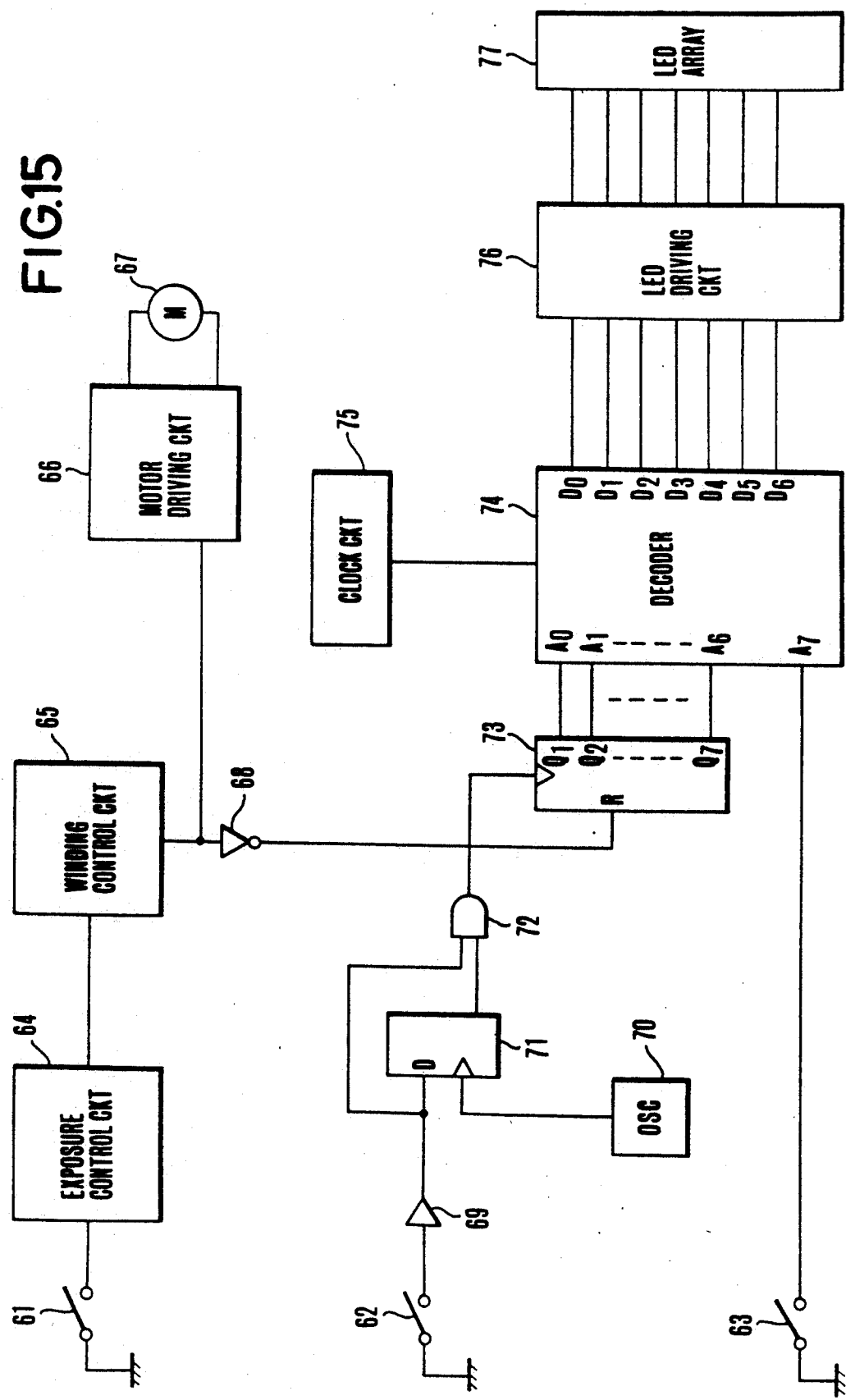

FIG.18
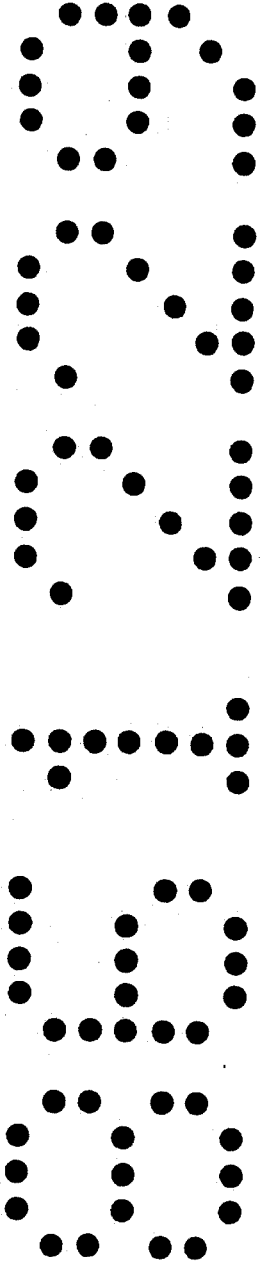
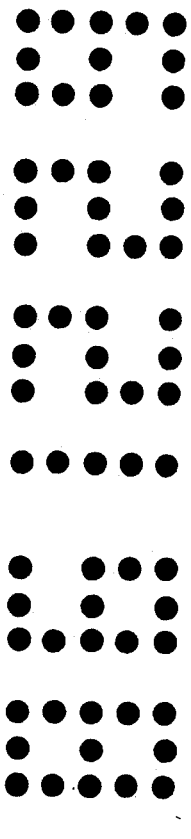

DATA IMPRINTING DEVICE FOR CAMERA

This application is a continuation of application Ser. No. 07/681,649 filed Apr. 8, 1991, which is a continuation of application Ser. No. 07/579,099 filed Sep. 7, 1990, which is a continuation of application Ser. No. 07/481,700 filed on Feb. 20, 1990, which is a continuation of application Ser. No. 07/384,106 filed on Jul. 21, 1989, which is a continuation of application Ser. No. 07/242,436 filed on Sep. 2, 1988, which is a continuation-in-part of application Ser. No. 07/074,228 filed on Jul. 16, 1987, all now abandoned.

BACKGROUND OF THE INVENTION

1. Field of the Invention

This invention relates to a data imprinting device for a camera and more particularly to a data imprinting device for a camera which is arranged to permit switch-over of the size of the photographing picture or image plane thereof between a standard or full size measuring 36 mm×24 mm and a half size measuring 18 mm×24 mm.

2. Description of the Related Art

Cameras of the kind arranged to permit photographing in the half image plane size have not been popular, with the exception of a time during which they enjoyed a boom, because of the considerably inferior quality of pictures obtainable with them. The majority of people have preferred to buy cameras of the 35 mm full-size photographing type. However, a recent improvement in the capacity of film has come to enable the half-size camera to give a finished picture which is not inferior to a picture obtained by the full-size camera as long as the picture is printed in the so-called service print size. This change, in addition to the economical advantage of having double the number of photographable frames, has come to bring the half-size camera before the footlights. However, the disadvantage of having the inferior picture quality evidently still shows when a commemorative photograph or the like is enlarged to a greater size.

In view of this, a camera which permits selection between the full size and the half size has been proposed in Japanese Laid-Open Patent Application No. SHO 54-26725, etc.

Meanwhile, cameras of the kind arranged to permit imprinting on the film some data such as a date have become popular. It has been desired to have these two functions incorporated in one and the same camera. However, an attempt to impart these two functions to one and the same camera encounters the following problems:

One problem resides in the size of data letters to be imprinted on the film. More specifically, the half size which is 18 mm×24 mm is one half of the full size which is 36 mm×24 mm. If an imprinting device is used both for imprinting data in the full size image plane and for imprinting in the half size image plane, the size of the imprinted letters is the same in both cases. Therefore, the ratio of the area of the imprinted data letters to the half-size frame area of the film is naturally twice as large as that of imprinted data letters to the full-size frame area. Assuming that the photograph is printed in the service size, for example, the imprinted letters in a half-size picture, which is as indicated by two-dot chain lines in FIG. 1 and also as indicated by FIG. 2 of the accompanying drawings, are so large and conspicuous because the size of letters becomes 1.5 times larger in both width and height than that of letters in a full-size picture that it ruins a precious commemorative photo or the like while the data letters imprinted in a full-size photo are of an adequate size.

A further problem resides in the positional location of the imprinted data letters on the half-size film.

There have been proposed methods of varied kinds for imprinting data on full-size film by driving a group of light emitting elements during film winding or rewinding. However, these methods bring about the following problem when they are applied to cameras of the full-half selection type:

FIG. 23 of the accompanying drawings shows a first example where the group of light emitting elements is arranged outside of an aperture of a camera according to one of the above stated methods. Referring to FIG. 23, on the right-hand side of the drawing is located a spool in one case and a film cartridge in another case.

1) In case where the group of light emitting elements is arranged on the side of the spool to imprint data during film winding: A film winding action causes the film 101 to move in the direction of arrow. In the full-size photographic mode, an exposed image plane 102a is shifted to a position 102b when one frame portion of film is wound up. In the process of this movement, the light emitting element group 103 is driven at a predetermined timing to imprint data in a position A on the image plane 102a. In the figure, a reference numeral 104 denotes an aperture provided for the full-size photographic mode.

In the half-size photographic mode, an exposed image plane 105a is shifted to be located in a position 105b upon completion of one frame winding. However, at this point of time, the image plane 105 on which data is to be imprinted has not yet completely passed the light emitting element group 103. It is, therefore, impossible to imprint data by driving the light emitting element group 103 during the one-frame winding. In this instance, therefore, data can be imprinted in a position B on the image plane 105a by driving the light emitting element group 103 during a next one-frame winding process. In the event of the half-size photographic mode, therefore, the length of time between the start of a winding action on the image plane 105a located in the position 105b and the start of light emission by the light emitting element group 103 differs from the length of time required for the full-size photographic mode.

2) In cases where data is to be imprinted during film rewinding with the light emitting element group 103 arranged on the side of the film cartridge: The film 101 moves in the direction of arrow when a film rewinding action begins. In the full-size photographic mode, the exposed image plane 102a moves to be located in the position 102b after completion of rewinding of one frame. During this movement, the light emitting element group 103 is driven at a predetermined timing to imprint data in the position A on the image plane 102a.

In the half-size photographic mode, the exposed image plane 105a moves to be located in the position 105b after completion of rewinding of one frame. At this stage, however, the data cannot be imprinted by driving the light emitting element group 103 during the process of one-frame rewinding, because the image plane 105a has not yet completely passed the light emitting element group 103. In this mode, therefore, data is imprinted in the position B on the image plane 105a by driving the light emitting element group 103 during the process of rewinding a next frame portion of the film. Like in the above stated case 1), the length of time between the start of a winding action on the image plane 105a and the start of light emission by the light emitting element group 103 differs from the length of time required for the full-size photographic mode.

FIG. 24 shows a second example of application, wherein the light emitting element group 103 is disposed within the aperture. Like in the first example, two cases are also conceivable. In one case, the spool is disposed on the right-hand side. In the other case, the film cartridge is disposed on the right-hand side. Since data imprinting during film rewinding is performed in the same manner as in the case of the first example, data imprinting during film winding is alone described below:

In the full-size photographic mode: The light emitting element group 103 is driven to imprint data in a position A on an exposed image plane 102a at a predetermined timing during the process of winding of the film 101. In the half-size photographic mode, the light emitting element group 103 is driven to imprint data in a position B on the exposed image plane 105a at a predetermined timing during the process of winding of the film 101. In this case, the moving extent of film from the start of film winding until arrival of a foremost imprinting point (front end of the position A or B) of the frame at the front of the light emitting element group 103 is m1 or m2 and thus varies with the photographic mode. The light emitting timing for imprinting data on each frame in the full-size photographic mode thus differs from the timing in the half-size photographic mode.

As apparent from the foregoing description of the first and second examples of application, the light emitting timing for data imprinting must be changed according to selection between the full- and half-size photographic modes when any of the different data imprinting methods is applied to the camera of the full-half selection type. Without any change in the light emitting timing, it would be impossible to have data imprinted always in an appropriate part of the image plane. Whereas, no solution of this problem has been proposed.

SUMMARY OF THE INVENTION

This invention is directed to solutions for the above stated problems. It is therefore one object of the invention to provide a camera of the kind arranged to permit switching from one photographing picture- or image-plane size over to another with a data imprinting device including means for changing the size of imprinting data to an adequate size according to the photographing image plane size selected. Therefore, the data imprinting device according to the invention is capable of effectively preventing a photograph from having its appearance ruined by disproportionally imprinted data.

It is a further object of this invention to provide a camera having a data imprinting function which is capable of imprinting data always correctly in predetermined positions within an image plane either in the full-size photographic mode or in the half-size photographic mode whichever is selected.

Other objects and features of this invention will become apparent from the following detailed description of embodiments thereof taken in connection with the accompanying drawings.

BRIEF DESCRIPTION OF THE DRAWINGS

FIG. 15 is a circuit block diagram showing a camera provided with a data imprinting device which is arranged as a third embodiment of this invention which corrects imprinted data size in accordance with the selected photographing image plane.

FIG. 18 shows the details of a decoder shown in FIG. 15.

DETAILED DESCRIPTION OF THE PREFERRED EMBODIMENTS

Figure 1:
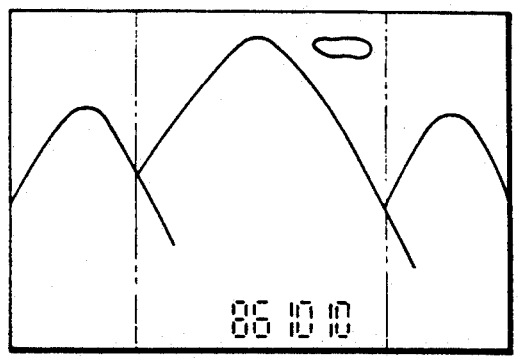
FIG. 1 is an illustration showing, by way of example, data imprinted in a standard or full-size photographing image plane by the conventional data imprinting device.
Figure 2:
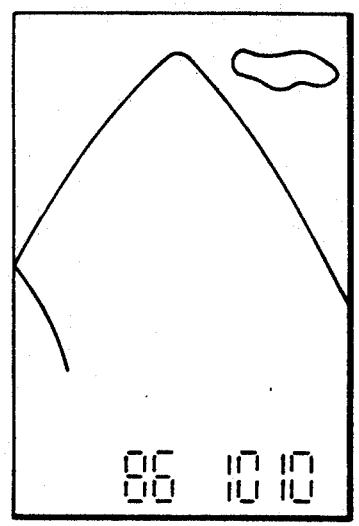
FIG. 2 is an illustration showing, by way of example, data imprinted in a half-size photographing image plane by the conventional data imprinting device in a state of being enlarged to a size corresponding to the standard or full size.
Figure 3:
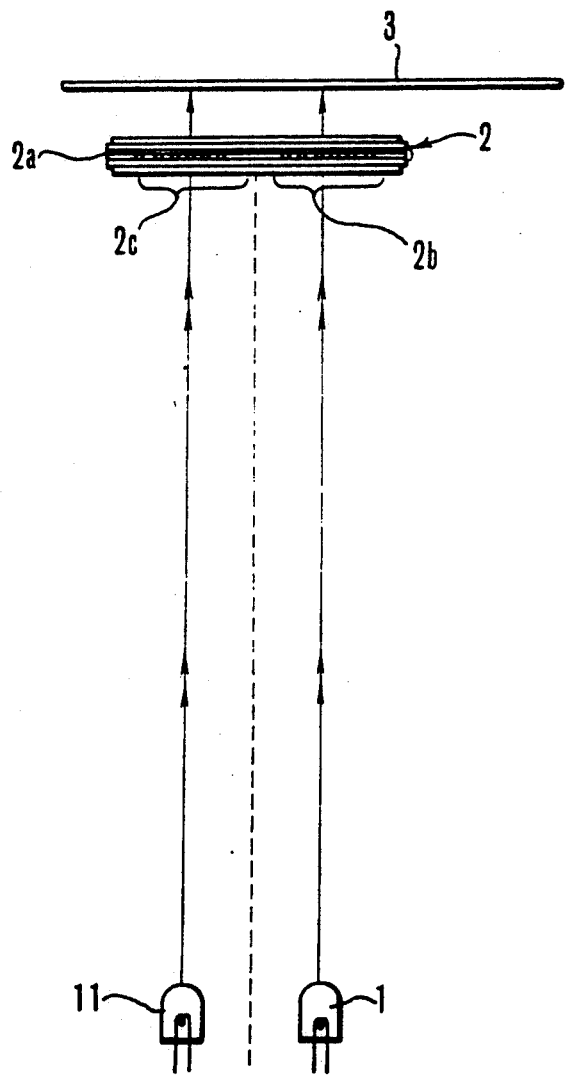
FIG. 3 is a schematic view showing in outline a data imprinting device arranged according to this invention as a first embodiment thereof which corrects imprinted data size in accordance with the selected photographing image plane.
Figure 4:
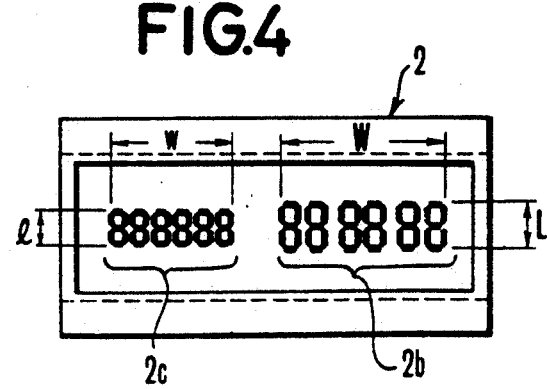
FIG. 4 is a plan view showing a transmission type liquid crystal display.

The following describes the embodiments of this invention with reference to the accompanying drawings:

FIGS. 3 and 4 schematically show in outline and in a plan view the arrangement of a data imprinting device arranged as a first embodiment of this invention which corrects imprinted data size in accordance with the selected photographing image plane.

Referring to FIGS. 3 and 4, incandescent lamps 1 and 11 are provided for imprinting in a standard-size (or full-size) image plane mode and in a half-size image plane mode, respectively. The optical paths of these lamps are separated and shielded respectively with walls which are not shown. A transmission type liquid crystal display body 2 has a liquid crystal 2a sealed therein and mask parts 2b and 2c which are aligned. Each of the mask parts 2b and 2c has letter parts formed by vapor depositing chromium thereon. These mask parts 2b and 2c are arranged to be used for data imprinting during a standard-size (full-size) photographing operation and a half-size photographing operation, respectively. The incandescent lamp 1 and the mask part 2b of the liquid crystal display body 2 jointly form a data imprinting optical system for the standard-size image plane, while the incandescent lamp 11 and the mask part 2c of the liquid crystal display body 2 form a data imprinting optical system for the half-size image plane.

Further, as shown in FIG. 4, the vertical length and the transverse length w of the mask part 2c are about 0.7 times as large as the vertical length L and the transverse length W of the mask part 2b while the area Z×w is about ½ of the area L×W. The data is arranged to be imprinted on a film 3.

Figure 5:
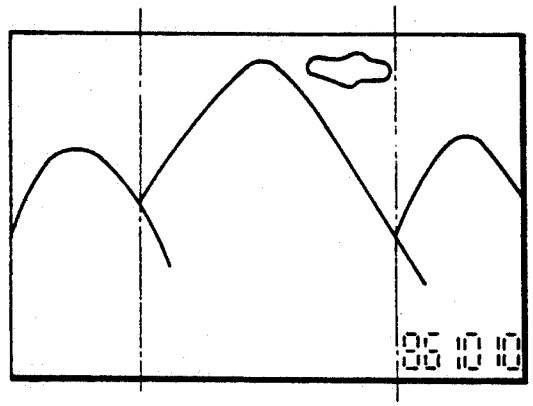
FIG. 5 is an illustration showing data imprinted in a standard size photographing image plane by the same embodiment.
Figure 6:
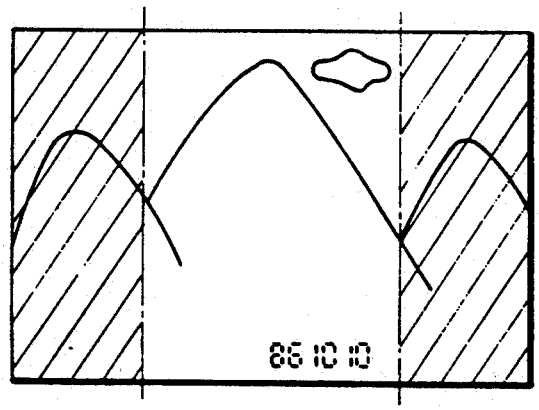
FIG. 6 shows data imprinted in a half-size photographing image plane by the same embodiment.
Figure 7:
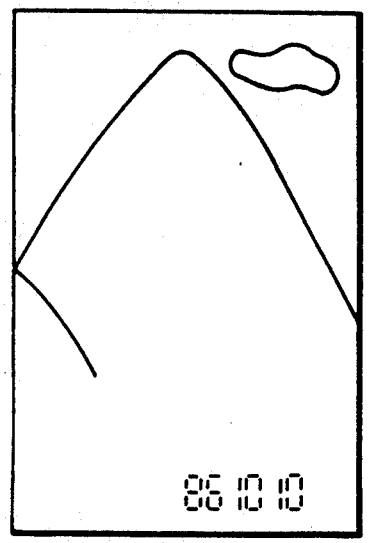
FIG. 7 shows the half-size photographing image plane in a state of being enlarged to a size corresponding to the standard size photographing image plane.

In imprinting the data with the embodiment which is arranged as described above, either the letters of the mask part 2b or those of the mask part 2c of the liquid crystal display body 2 are imprinted on the film 3 by causing the incandescent lamp 1 or 11 to emit a light according to selection of the standard-size image plane or the half-size image plane. The letters are imprinted in the size and position as represented by FIG. 5 in case of the standard-size photographing or as represented by FIG. 6 in the event of the half-size photographing. In this instance, the size of the letters imprinted during the half-size photographing is ½ of the letters imprinted during the standard size photographing in terms of an area ratio between them. In FIGS. 5 and 6, the half-size image plane is indicated by a part defined with two-dot chain lines in relation to the standard-size image plane. When the half-size image plane shown in FIG. 6 is enlarged to a size corresponding to the standard-size picture or image plane as shown in FIG. 7, the size of the letters becomes about the same as that of the letters shown in FIG. 5. Therefore, when a picture obtained by the standard- or full-size photographing and a picture obtained by the half-size photographing are printed into pictures of the same size, their imprinted letters become about equal in size.

Figure 8:
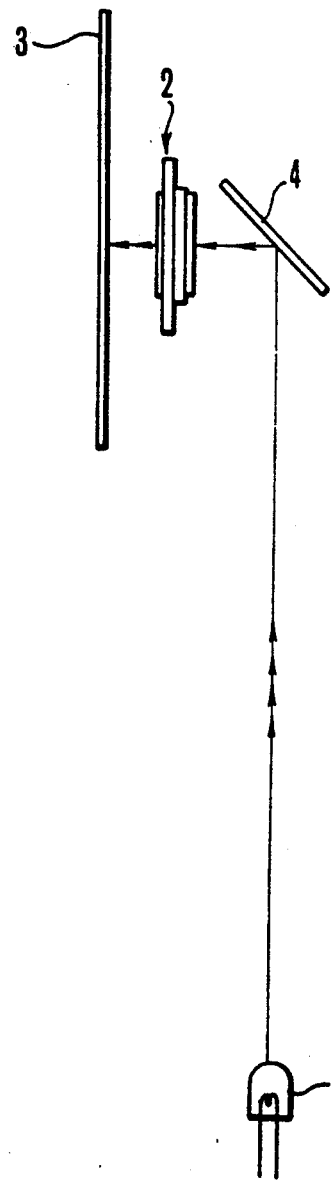
FIG. 8 schematically shows the data imprinting device in a state of being incorporated in the back lid of a camera.

FIG. 8 shows the embodiment of this invention in a state of being incorporated in the back lid of a camera. For simplification's sake, parts arranged to perform the same functions as those described in the foregoing are indicated by the same reference numerals.

In the case of this embodiment, the incandescent lamps 1 and 11 are arranged in such a way as to have their optical paths formed along the back lid which is not shown. The light of the incandescent lamp 1 or 11 is reflected 90 degrees by a mirror 4 and is allowed to pass through the transmission type liquid crystal display body 2, so that the data can be imprinted on the film 3 from the reverse side of the film.

Figure 9:
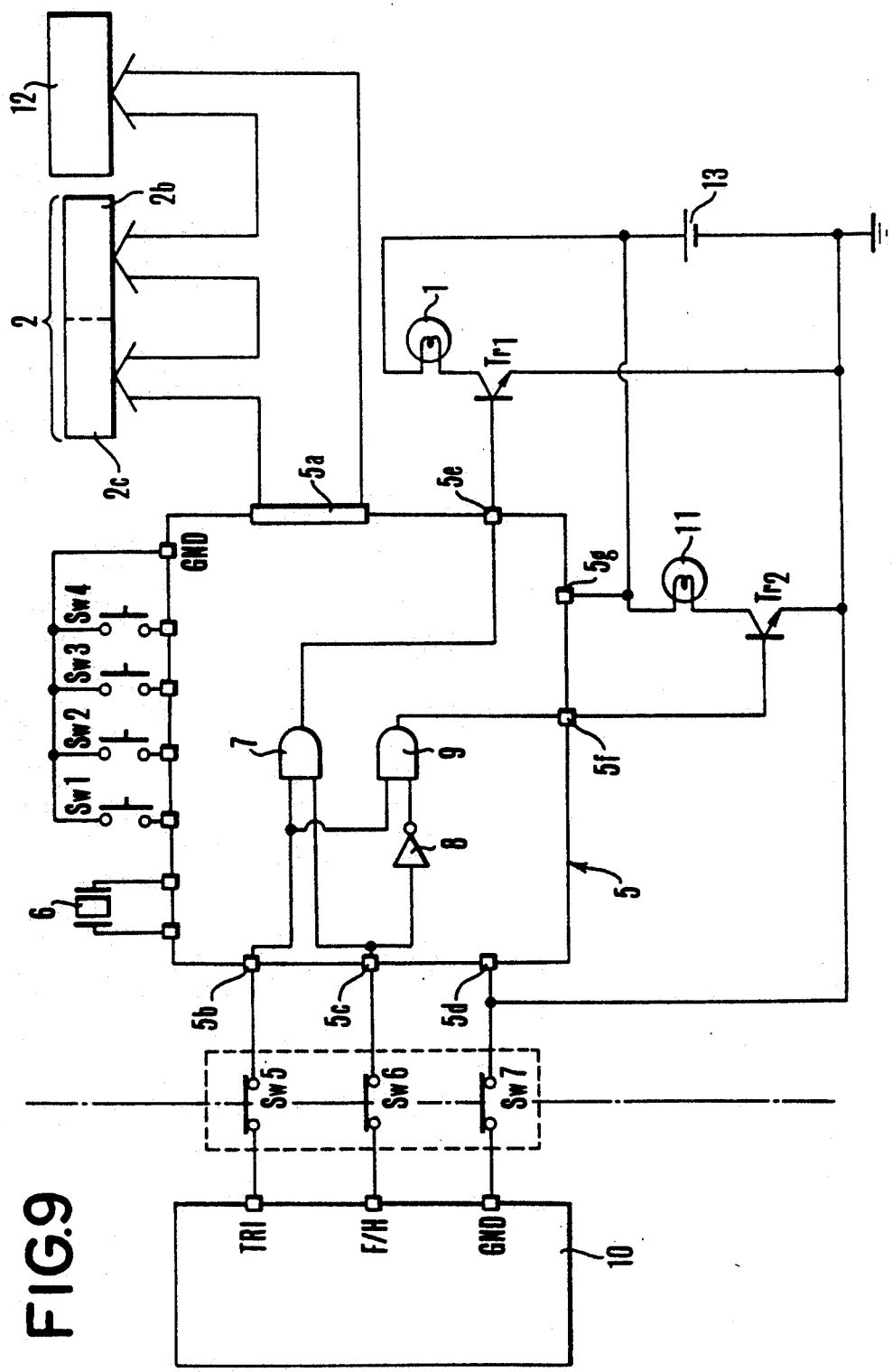
FIG. 9 is a circuit block diagram showing a circuit arranged to operate the data imprinting device of the first embodiment.

FIG. 9 is a block diagram of a circuit arranged to operate the data imprinting device of this embodiment. Referring to FIG. 9, a block 5 denotes an imprinting IC including: A terminal 5a which is arranged to produce and supply information to the transmission type liquid crystal display body 2 and to a liquid crystal display body 12 for an external monitor; a terminal 5b which is arranged to receive an imprint trigger signal (a high level signal) from a circuit 10 disposed on the side of a camera body; a terminal 5c which is arranged to receive an F/H signal indicative of the selection of full-size photographing or half-size photographing (at a high level in case of full-size photographing and at a low level in the event of half-size photographing); and a ground terminal 5d which is kept at the same potential as ground. The terminals 5b and 5c and the ground terminal 5d are respectively connected via switches Sw5, Sw6 and Sw7 to a terminal TRI, a terminal F/H and a terminal GND which are included in a circuit 10 disposed on the camera body side.

However, the switches Sw5, Sw6 and Sw7 can be dispensed with in case the circuit 10 on the camera body side and the imprinting IC 5 are interconnected by means of a flexible printed circuit board or the like.

The output end of the terminal 5b is connected to one of the input terminals of each of AND circuits 7 and 9. The output end of the terminal 5c is connected to the other input terminal of the AND circuit 7 and also to the other input terminal of the AND circuit 9 via an inverter circuit 8.

Further, to the imprinting IC 5 are connected a quartz crystal oscillator 6 and switches Sw1 to Sw4. The switch Sw1 is provided for selection among different modes of display such as "year-month-day", "day-hour-min" and "OFF" or the like. The switches Sw2 to Sw4 are provided for adjustment of "year", "month" and "day" or "day", "hour" and "min". The adjustment is arranged to be effected when there obtains the same potential as that of the ground. The imprinting IC 5 is further provided with an output terminal 5e which is connected to the output terminal of the above stated AND circuit 7 which is arranged to allow a base current to flow to a transistor Tr1 for driving the incandescent lamp 1 when the camera is in its full-size photographing mode; an output terminal 5f which is connected to the output terminal of the above stated AND circuit 9 which is arranged to allow a base current to flow to a transistor Tr2 for driving the incandescent lamp 11 when the camera is in its half-size photographing mode; and a terminal 5g which is arranged to receive the voltage of a power supply battery 13.

In the embodiment described, the photographer is assumed to make a choice between the standard- or full-size image plane photographing mode and the half-size image plane photographing mode when the camera is loaded with a film. In case that the full-size image plane mode is selected, a switch which is not shown but is disposed within the camera body turns on to allow a high level signal to be supplied from the circuit 10 of the camera body to the F/H signal terminal 5c of the imprinting IC 5.

When the photographer takes a shot, an imprint trigger signal is supplied at a high level from the circuit 10 of the camera body to the terminal 5b of the imprinting IC 5. As a result of this, the AND circuit 7 within the imprinting IC 5 receives high level signals at its two input terminals and thus produces a high level signal. The high level signal causes a base current to flow from the trigger output terminal 5e to the base of the transistor Tr1. The transistor Tr1 then turns on to allow a current flow to the incandescent lamp 1. The lamp 1 then emits a light. The light passes through the mask part 2b of the transmission type liquid crystal display body 2 to imprint data on the film.

Meanwhile, a high level signal which is supplied to the inverter circuit 8 is turned into a low level signal. The low level signal is supplied to one of the input terminal of the AND circuit 9, the AND circuit 9 produces a low level signal. As a result, no current flows from the trigger output terminal 5f. Therefore, the transistor Tr2 remains off and no current flows to the other incandescent lamp 11. The lamp 11 therefore does not emit any light. The data of the mask part 2c of the transmission type liquid crystal display body 2 is not imprinted on the film 3.

When the half-size image plane mode is selected, a low level signal is supplied to the terminal 5c, there obtains a condition which is opposite to the above stated case. The transistor Tr2 turns on to cause the incandescent lamp 11 to emit a light. The data of the mask part 2c is imprinted on the film 3 by the light passing through the mask part 2c. Meanwhile, the transistor Tr1 remains off. No light is emitted by the incandescent lamp 1. The data of the mask part 2b is therefore not imprinted in this case.

The imprinting optical system is thus selected on the basis of the information on the selected picture size.

In the embodiment described, the mask parts 2b and 2c of the liquid crystal display body 2 are formed within one and the same liquid crystal display body. However, this arrangement may be changed to have them formed with discrete liquid crystal display bodies.

In accordance with the above stated arrangement of this embodiment, the data can be selectively imprinted on the basis of the picture size information by selecting one of the different arrays of letters of different sizes arranged on the liquid crystal display body. Therefore, the data or letters can be imprinted in a size highly suited to the selected picture size to ensure an appropriately balanced letter imprint even in the event of a picture taken in the half-size image plane mode.

Further, the embodiment comprises a plurality of imprinting optical systems. Each of them consists of an incandescent lamp and a liquid crystal display body. The embodiment is arranged to electrically select one of the imprinting optical systems according to information on the size of the photographing picture or image plane before the data letters are imprinted. Therefore, data letters can be imprinted within a suitably selected part of the photographing image plane, such as a lower right-hand side part of the image plane.

Figure 10:
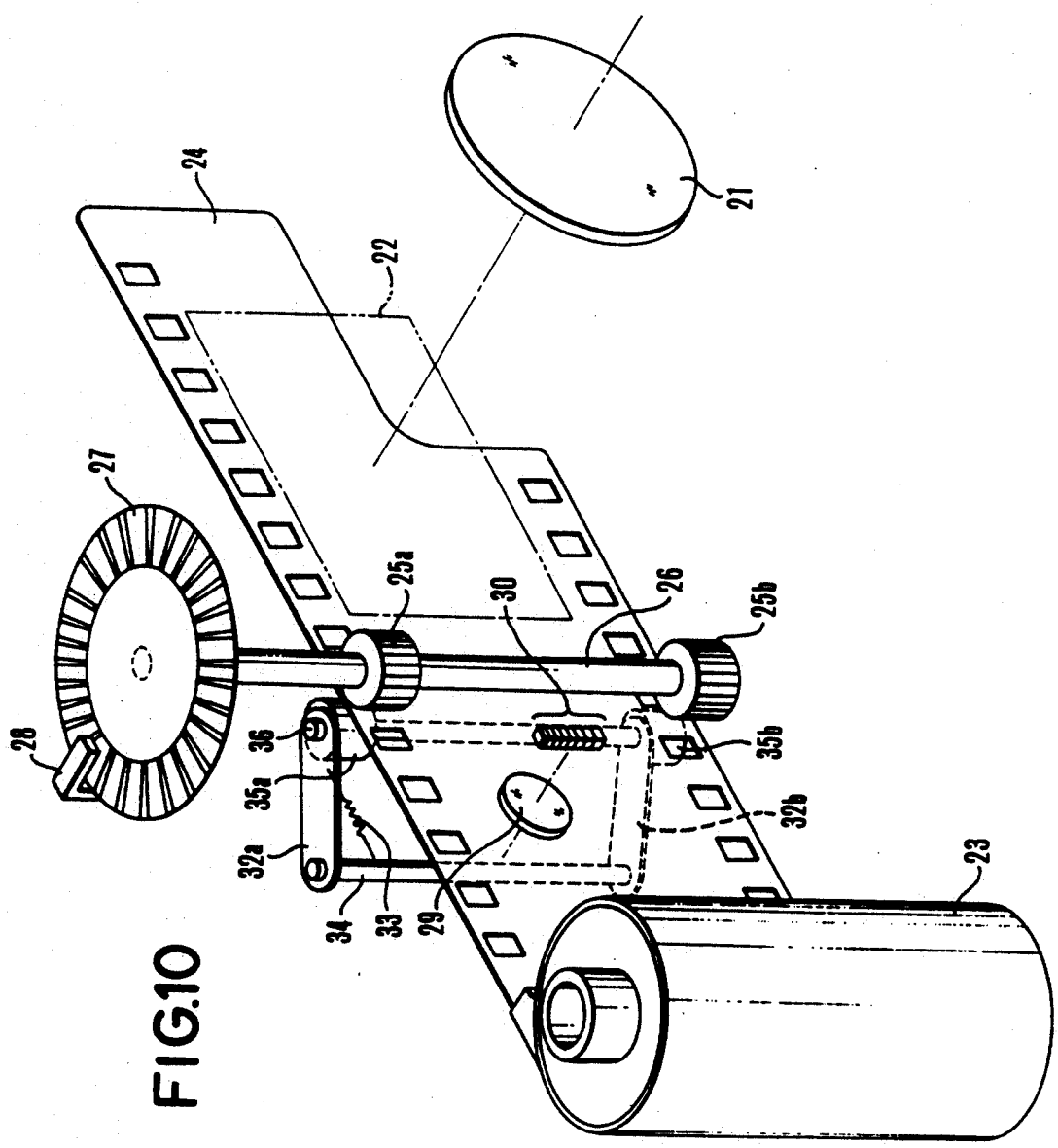
FIG. 10 is an oblique view schematically showing a camera which is provided with a data imprinting device arranged as a second embodiment of this invention which corrects imprinted data size in accordance with the selected photographing image plane.

FIG. 10 schematically shows in an oblique view a camera which is equipped with a data imprinting device arranged as a second embodiment of this invention. The second embodiment is arranged as follows: Referring to FIG. 10, the illustration includes a photo taking lens 21; an aperture 22 which is indicated with a one-dot chain line and is to be used for photographing in the full-size image plane mode; a film cartridge 23; and a film 24.

A roller shaft 26 has a pair of upper and lower rollers 25a and 25b formed in one unified body therewith. To the upper end of the roller shaft 26 is secured a slit disk 27, which is arranged to be rotatable with the roller shaft 26. The slit disk 27 is provided with a slit pattern consisting of transparent and opaque parts which are alternately arranged at even pitch of intervals. While the slit pattern is shown as in a relatively coarse state in FIG. 10, the slit pattern is very finely arranged in actuality.

Figure 11A:
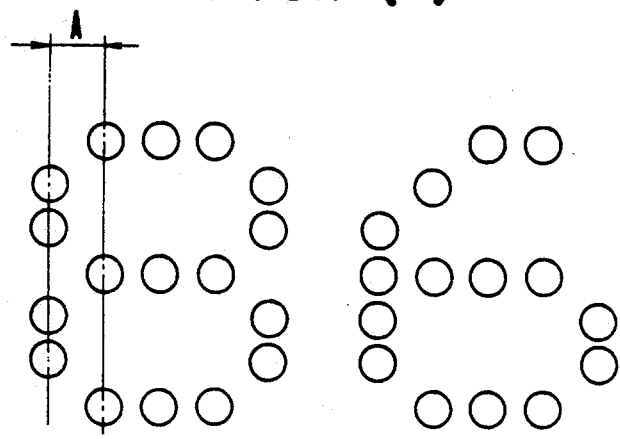
FIGS. 11(a) and 11(b) show the data imprinting state of the data imprinting device of FIG. 10.
Figure 11B:
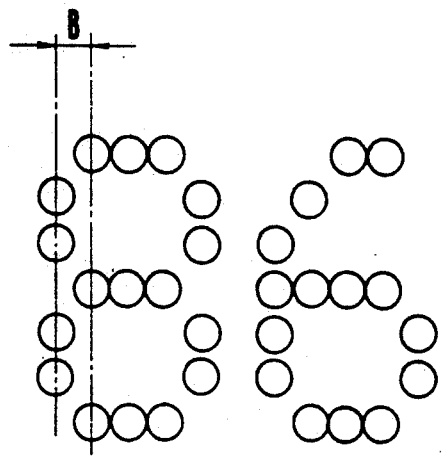

A pair of upper and lower presser rollers 35a and 35b which are in one body with a shaft 36 are opposed to the rollers 25a and 25b. The two ends of the shaft 36 are rotatably fitted into and carried by support plates 32a and 32b respectively. The support plates 32a and 32b are pivotally carried by a fixed shaft 34 and are urged by a tension spring 33 to turn clockwise round the fixed shaft 34. A plurality of light emitting elements for data imprinting are vertically aligned and are arranged to imprint data on a film 24 via an image forming lens 29 in dot patterns. A photo-interrupter 28 which is of a transmission type is arranged to detect the slit pattern of the slit disk 27. The photo-interrupter 28 does not have to be the transmission type but may be of a reflection type. The data imprinting device which is arranged in this manner operates as described below:

When the film 24 is caused to travel into the film cartridge 23 for rewinding it, the rollers 25a and 25b which are in contact with the film 24 are turned round counterclockwise. Then, the slit disk 27 also rotates counterclockwise together with these rollers. A pulse signal is generated every time the photo-interrupter 28 detects each of the slits which are finely formed in the slit disk 27. In the full-size image plane photographing mode, a light emission trigger signal is applied to the light emitting element 30 every time three pulse signals are thus generated. The light emission trigger signal then causes the light emitting element 30 to emit a light over a predetermined period of time and thus imprints the light on the surface of the film 24. The details of the light emission trigger signal to be applied to the light emitting element 30 are as follows: In the full-size image plane photographing mode, the light emission trigger signal is produced every time three pulse signals are produced from the photo-interrupter 28 as mentioned above. Meanwhile, in the event of the half-size image plane photographing mode, the light emission trigger signal is produced every time two pulse signals are produced from the photo-interrupter 28. In other words, the light emitting element 30 is arranged to emit light at different intervals for the full-size mode from the light emitting intervals for the half-size mode in the ratio of 3:2. Referring to FIGS. 11(a) and 11(b), this difference in the light emitting intervals can be expressed as A:B=3:2. Accordingly, in imprinting a data letter in the form of a dot matrix, the width of the letter for the half-size mode can be reduced to ⅔ of that of the letter for the full-size mode. This is because the ratio of the letter width to the whole image or picture plane of the full-size mode is 1.5 times (3/2 times) as wide as that of the half-size mode. In the event of the half-size mode, the width of the data letters to be imprinted on the film surface is thus adjusted to the same ratio to the image plane as in the case of the full-size mode by reducing it to ⅔. It goes without saying that the arrangement to generate the light emission trigger signal at intervals of three or two pulse signals produced from the photo-interrupter 28 according to the selected size mode may be changed to any other suitable method as long as the light emitting element 30 is arranged to emit its light at different intervals in the ratio of 3:2 between the full- and half-size modes. For example, the light emitting interval may be defined by six pulse signals from the photo-interrupter 28 in the full size mode and by four in the event of the half-size mode.

Again referring to FIG. 10, the presser rollers 35a and 35b are pushed by the force of the tension spring 33 against the rollers 25a and 25b across the film 24. Therefore, the rollers 35a and 35b rotate without slipping on the film 24 when the film 24 travels in between the rollers 25a and 25b and the presser rollers 35a and 35b. Therefore, the rollers 25a and 25b reliably rotate to a predetermined degree relative to the movement of the film 24 to a predetermined extent. This ensures accurate detection of the moving extent of the film 24.

Figure 12:
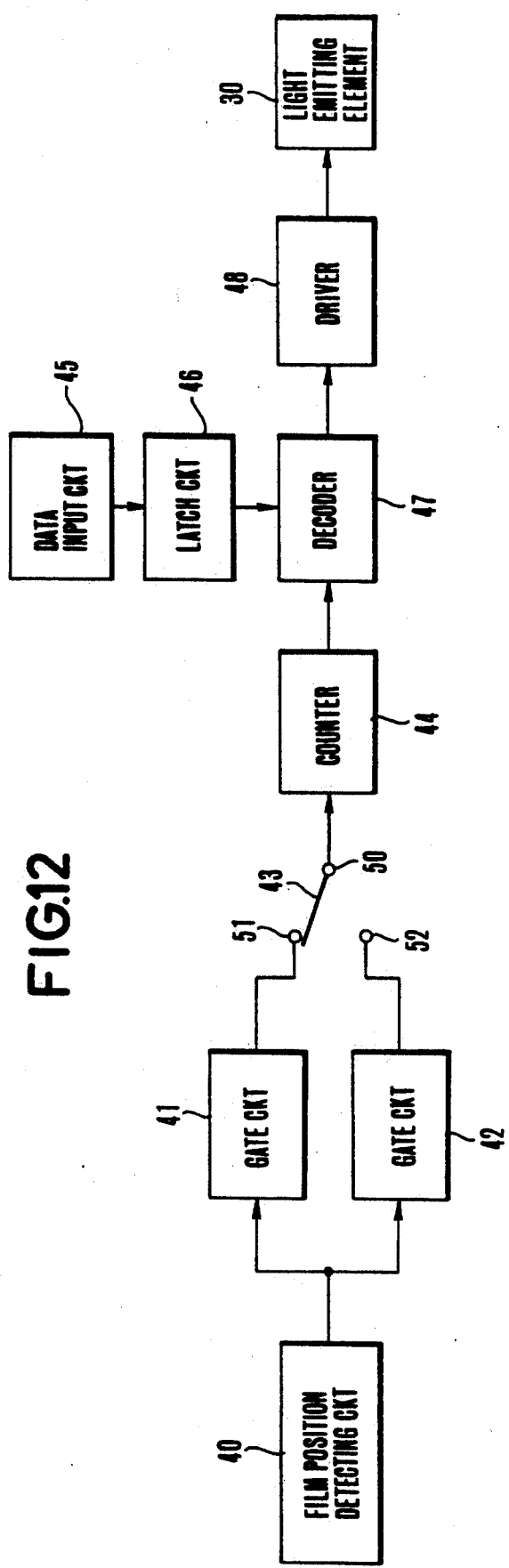
FIG. 12 is a circuit block diagram schematically showing the data imprinting device of the second embodiment.

FIG. 12 is a block diagram schematically showing a circuit arrangement required for operating the data imprinting device of FIG. 10. FIG. 12 includes a film position detecting circuit 40 which is arranged to generate a pulse every time one slit pattern of the slit disk 27 is detected by the photo-interrupter 28 of FIG. 10. This pulse is supplied to gate circuits 41 and 42, which are arranged at an ensuing stage to be composed of counters in such a way as to produce different numbers of pulses with the same number of pulses received by them. For example, the gate circuit 41 produces one pulse every time it has received three input pulses while the other gate circuit 42 produces one pulse every time it has received two input pulses.

A change-over switch 43 is arranged to select either the full-size photographing mode or the half-size photographing mode. A terminal 50 of the switch 43 is connected to a terminal 51 in the case of the full-size mode and to another terminal 52 in the case of the half-size mode. Therefore, the output of the gate circuit 41 or that of the gate circuit 42 is selectively supplied, according to the selected mode, to a counter 44 and thus becomes an address signal.

A data input circuit 45 is arranged to set data letters to be imprinted on the film by means of data input means which is not shown. The data letters set by the circuit 45 are retained by a latch circuit 46 until renewal of the data letter setting. The data letters are supplied to a decoder 47 to be converted into data information. Then, in accordance with the address signal which is set at the counter 44, the data information of the decoder 47 is supplied to a driver 48 of an ensuing stage. The driver 48 then drives the light emitting element 30.

In the case of this embodiment, the data imprinting device is arranged to change the light emitting interval of the light emitting element 30 from one interval value over to the other interval value by selecting the gate circuit 41 or the gate circuit 42. However, this invention is of course not limited to that arrangement. The arrangement may be changed in the following manner: The slit disk may be replaced with two slit disks of different slit pattern pitches, one solely for the full-size photographing mode and the other solely for the half-size photographing mode. Then, photo-interrupters are discretely arranged to detect their slits respectively. One of these photo-interrupters is selectively driven according to the selection of the full-size photographing mode or the half-size photographing mode.

Figure 13:
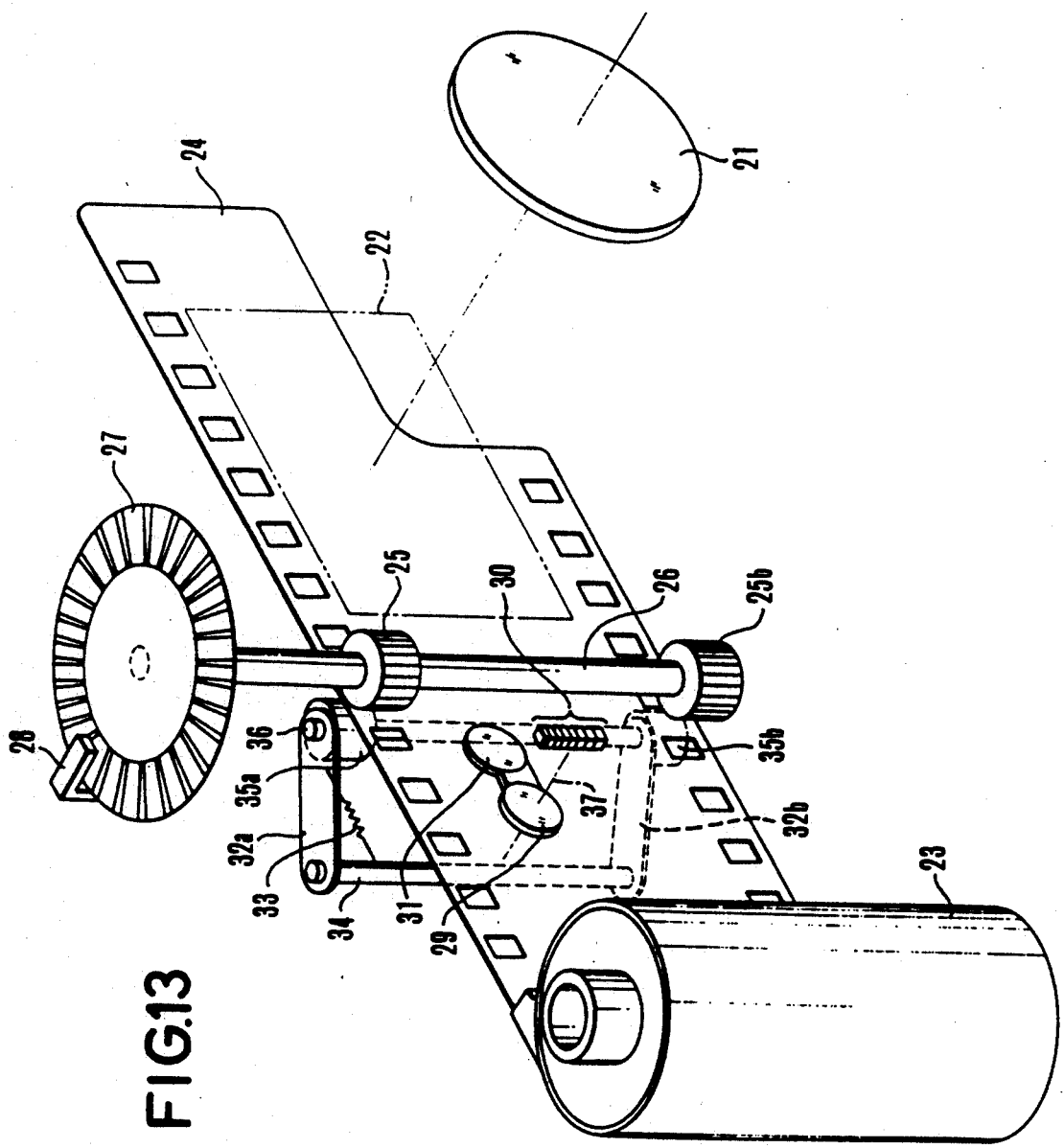
FIG. 13 is an oblique view schematically showing by way of example a modification of the camera of FIG. 10.

In the embodiment described, the width of the data letters to be imprinted with dots on the film surface by the light of the light emitting element is narrowed to prevent it from becoming excessively wide in relation to the image plane in the event of the half-size mode with the intervals between the dots shortened by changing the timing of the light emission trigger signal applied to the light emitting element in response to change-over from the full-size mode to the half-size mode. Meanwhile, however, the height of the letters remains unchanged at the time of change-over from the full-size mode to the half-size mode. As a result, the height of the imprinted letters is excessively high in the event of the half-size mode photographing. In view of this, another embodiment of this invention is arranged to have the height of the imprinted data letters in the same ratio to the image plane in both the full-size and the half-size modes. That embodiment is arranged as described below:

FIG. 13 shows the embodiment in an oblique view. In FIG. 13, the same components and parts as those shown in FIG. 10 are indicated by the same reference numerals and details of them are omitted from the description given here which covers only the parts differing from the preceding embodiment. An image forming lens 29 which is to be used for full-size mode photographing and another image forming lens 31 which is to be used for half-size mode photographing are jointly formed in one body and are arranged to be movable sidewise. The image forming lens 29 is positioned on a data imprinting optical axis 37 in the full-size mode and the other image forming lens 31 on the optical axis 37 in the event of the half-size mode. The positional interchange of the image forming lenses 29 and 31 takes place in association with the change over between the full-size mode and the half-size mode.

The optical system of the embodiment is arranged such that the imprinting magnification obtainable by the use of the image forming lens 31 is ⅔ of the imprinting magnification obtainable by the use of the other image forming lens 29. In other words, the data imprinting image forming lens 31 is arranged such that the height of the letters imprinted on the film surface 24 by the light emitting element 30 in the half-size mode is ⅔ of the height of letters imprinted in the full-size mode.

With the data imprinting device of FIG. 13, both the height and width of the letters imprinted in the half-size mode thus become ⅔ of those of the letters imprinted in the full-size mode. Therefore, the embodiment is capable of having the size of the imprinted data letters in the same ratio to the image plane both in the full-size mode and half-size mode photographing operations.

Figure 14A:
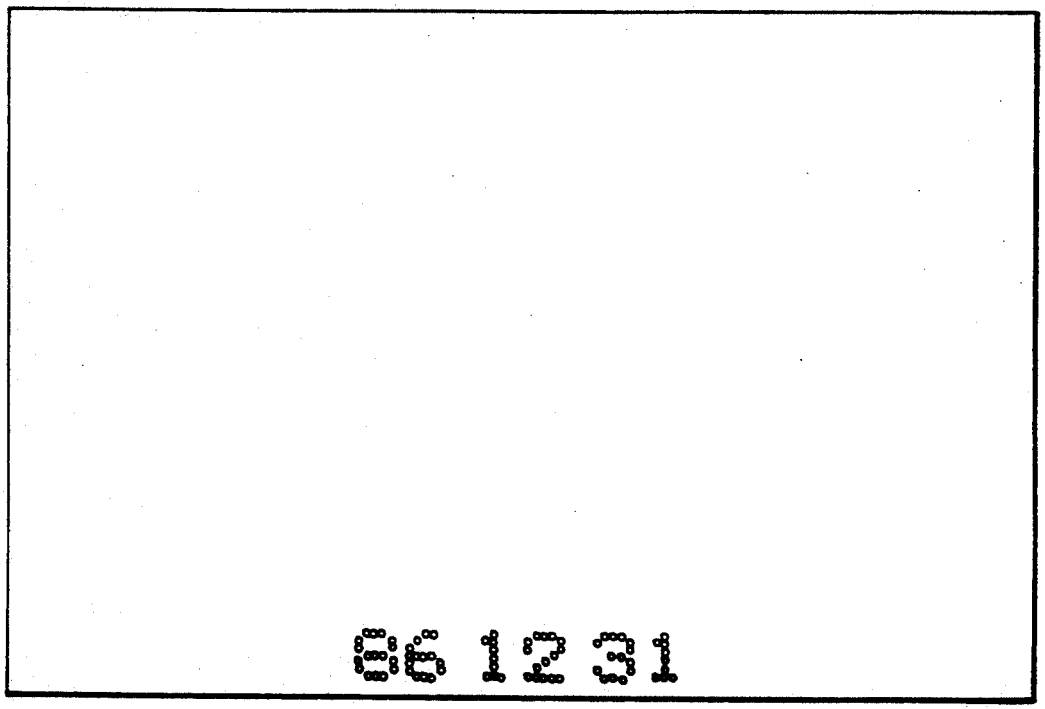
FIGS. 14(a), 14(b) and 14(c) show the size and form of the data letters imprinted by the data imprinting device of the second embodiment.
Figure 14B:
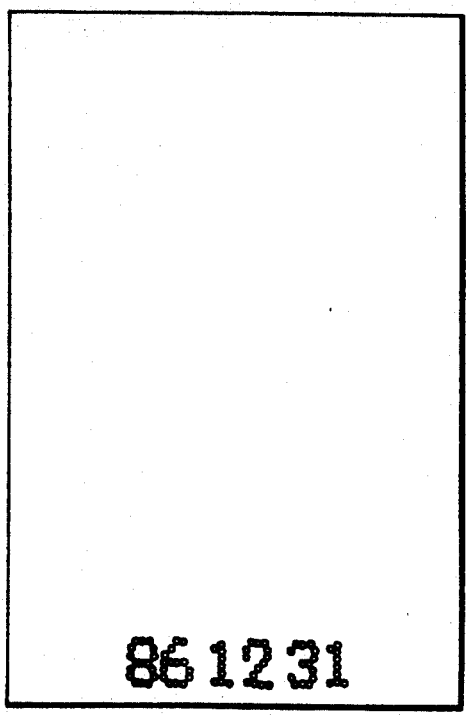
Figure 14C:
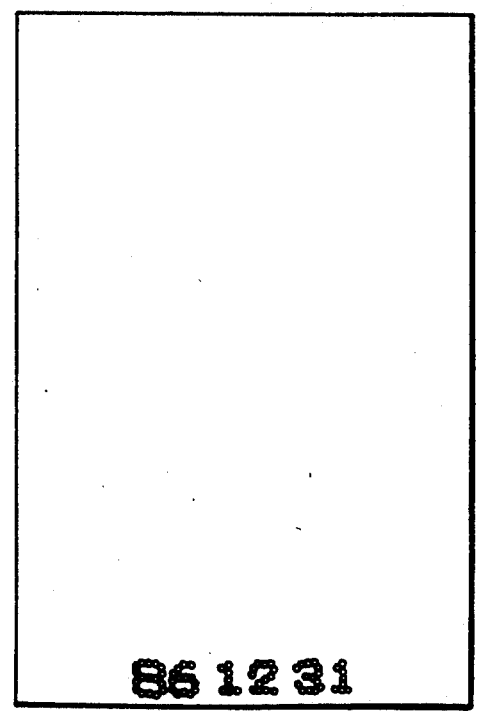

FIGS. 14(a), 14(b) and 14(c) show the data letters imprinted by the above stated data imprinting device in the full-size mode and the half-size mode. The imprinted data letters are shown in these drawings as obtained in the same rate of magnification. Of these drawings, FIG. 14(a) shows the data letters imprinted in the full-size mode; FIG. 14(b) shows the data letters imprinted in the half-size mode with the width thereof alone shortened; and FIG. 14(c) shows the data letters imprinted in the half-size mode with both the width and height of them shortened.

Next, a third embodiment of this invention is arranged as follows: FIG. 15 shows in a block diagram the circuit arrangement of a data imprinting device incorporated in a camera as the third embodiment. Referring to FIG. 15, the camera includes a release switch 61; a sprocket switch 62; a size change-over switch 63 which is arranged to turn on when the size of frames is changed from the full size thereof over to a half size; a known exposure control circuit 64; a known winding control circuit 65 which is arranged to control a motor 67 via a motor driving circuit 66 upon receipt of an exposure control end signal from the exposure control circuit 64; an inverter 68; a buffer 69; an oscillation circuit 70; a D flip-flop 71; an AND gate 72; a binary counter 73; and a decoder 74. The decoder 74 is arranged to cause information produced from a clock circuit 75 to be imprinted via an LED driving circuit 76 and an LED array 77 as data either in 7×5 dots or in 5×3 dots according to the outputs of the binary counter 73 and the above stated size change-over switch 63.

Figure 16:
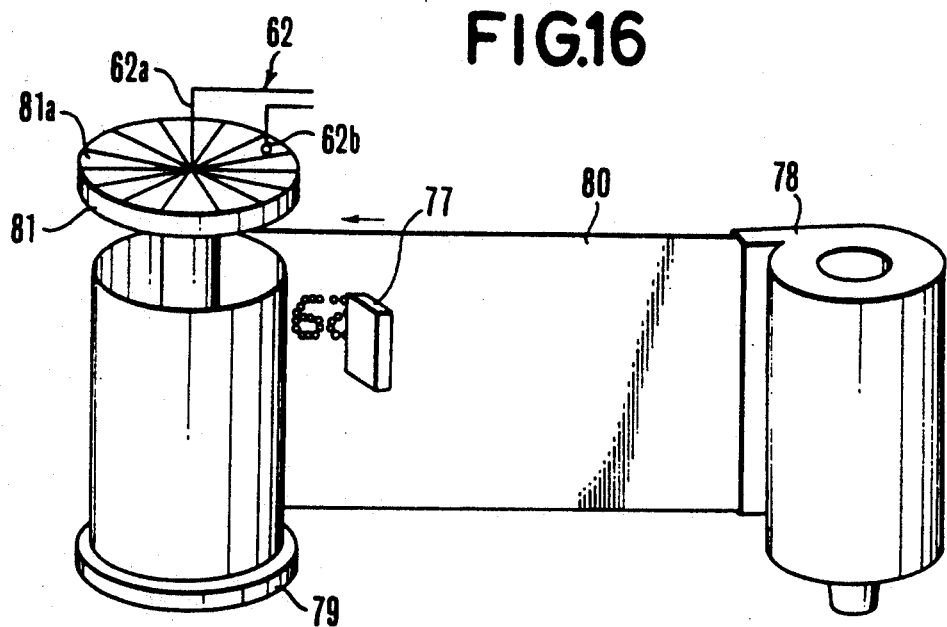
FIG. 16 is an oblique view showing the third embodiment in a state of imprinting data with dots by the arrangement shown in FIG. 15.

FIG. 16 is an oblique view showing a data imprinting operation of the arrangement shown in FIG. 15. The illustration includes a film cartridge 78. A spool 79 is mechanically connected to the above stated motor 67 and is arranged to pull out and take up a film 80 from the cartridge 78 as the motor 67 is rotated. A rotating plate or disc 81 is formed in one unified body with the spool 79. Copper foil patterned parts 81a are formed on the upper surface of the rotating disc 81. A fixed contact piece 62a and a moving contact piece 62b form the above stated sprocket switch 62. The switch 62 turns on when these contact pieces 62a and 62b come to be on one and the same copper foil patterned part 81a.

Figure 17A:
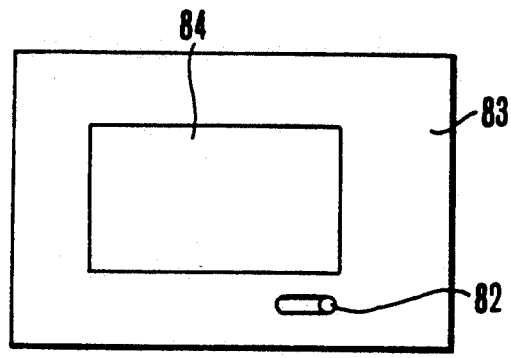
FIGS. 17(a) and 17(b) show the aperture size switchover effected by the camera of FIG. 15.
Figure 17B:
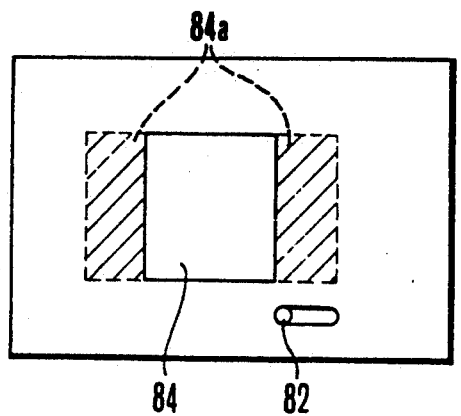

FIGS. 17(a) and 17(b) show the aperture part of the camera as viewed from behind the camera. An aperture change-over lever 82 is mounted on the camera body 83. The aperture 83 is in its full size when the lever 82 is in its right-hand side position as shown in FIG. 17(a); and becomes a half size with the side walls 84a of the aperture 84 intruding into the photo taking optical path when the lever 82 is in its left-hand side position as shown in FIG. 17(b).

The embodiment which is arranged as described above operates as follows: When the release switch 61 turns on, the exposure control circuit 64 operates and a photo taking operation is performed. Upon completion of the photo taking operation, the winding control circuit 65 begins to operate to cause the motor driving circuit 66 to drive the motor 67. Then, the motor 67 begins to take up one frame portion of the film 80. In response to the move of the film 80 (or spool 79), the sprocket switch 62 turns on and off to produce a signal. This signal is changed into a one-shot pulse through the buffer 69 by the D flip-flop 71 and the AND gate 72. The one-shot signal is supplied to the binary counter 73. During the process of film winding, the output of the inverter 68 is at a low level and the binary counter 73 is released from the reset state thereof. The counter 73 then produces either a high level signal or a low level signal from its output terminals Q1 to Q7 according to the counted content thereof. The output of the counter 73 is supplied to the address terminals A0 to A7 of the decoder 74. Then, the decoder 74 produces data according to this from its output terminals D0 to D6 to the LED driving circuit 76. FIG. 18 shows by way of example data corresponding to an address to be thus supplied to the above stated address terminals A0 to A7 of the decoder 74. For example, the data is "E3" when address is "29". (The size change-over switch 63 is assumed to be in an ON state in this instance.) In FIG. 18, reference symbols "a" to "g" correspond to the output terminals D0 to D6 of the decoder 74. A date "86-12-29" which is shown by way of example in FIG. 18 is arranged to be supplied from the clock circuit 75 and to vary as the present date varies.

With the above stated data produced from the decoder 74, the LED array 77 lights up according to the data through the LED drive circuit 76. Then, the dots are imprinted one after another as film winding proceeds to have letters formed by the dots. In FIG. 16, a figure "9" and a part of a figure "2" jointly representing a day are shown as being imprinted in a given position on the film 80.

When the aperture 84 is shifted from the full size to the half size by means of the aperture change-over lever 82, i.e. from the state of FIG. 17(a) to the state of FIG. 17(b), the size change-over switch 63 turns off. A high level signal is supplied to the address terminal A7 of the decoder 74. Assuming that the address is "29 in this instance, the data of the address "29" becomes "71" (see FIG. 18). In other words, the data can be changed by just changing the most significant address only. Further, the contents of the decoder are arranged in such a manner that the height of the letters corresponds to seven dots when the size change-over switch 63 is in an ON state and to five dots when this switch 63 is in an OFF state. Therefore, in the event of selection of the half size, each letter is imprinted in a smaller size consisting of 5 ×3 dots than a larger size which is employed for the full size and consists of 7×5 dots.

In the embodiment, the size of the imprinting letters is determined according to selection of the full frame size or a half frame size. Letters are imprinted in a larger size for the full-size frame and in a smaller size for the half-size frame. When pictures taken in the full- and half-size modes are printed in the same size, the sizes of imprinted letters of these printed pictures become the same as each other to save the appearance of the picture from being ruined by the imprinted letters.

In each of the embodiments described, the size of the imprinting data is arranged to be automatically selected in response to the change-over from one photo taking image plane size to the other. However, this arrangement may be changed to permit the camera operator to manually select the size of the imprinting data. This modification can be made by arranging some manual selection switch to permit manual change-over of the terminals provided for selection of the size of the imprinting data.

Further, while each of the embodiments described is arranged to vary the size of the imprinting data according to the change-over from one photo taking image plane size to the other, this arrangement also may be changed to have the imprinting data size arranged to be variable according to the rate of printing magnification to be employed in the event of so-called trimming, whereby only a part of a picture taken is enlarged during a printing process. In that instance, selection of the size of the imprinting data may be made by replacing the photo-taking image-plane size change-over signal of the above stated embodiment with a trimming magnification signal or by enabling the camera operator to manually select a desired size of the imprinting data in the manner as described above.

Further, in each of the first, second and third embodiments described, the size of the photo taking image plane is arranged to be selectable from two sizes including the full and half sizes. This invention is, however, applicable also to a camera arranged to have the image plane size selectable from among three or more than three sizes. In such a case, the size of the imprinting data may be arranged to be variable either according to the selection of each of these different image plane sizes or to be a given size for different image plane sizes within a certain range and to be dispersively variable for the varied image plane sizes. This arrangement is applicable also to the above stated cases where the size of the imprinting data is selectable by a manual operation by the operator or by changing it according to the rate of trimming magnification.

As described in the foregoing, in accordance with this invention, the ratio of the size of the imprinted data to the size of a printed picture is arranged to be unvarying even in the event of a change in the range of printing pictures due to the change-over from one photo-taking image plane size to another. The invention thus eliminates the possibility of a printed picture being degraded by disproportionately imprinted data. Therefore, the invention has a very high degree of utility.

The invention also relates to apparatus in which the position of the imprinted data can be changed in accordance with the selected full-size or half-size mode.

Figure 19:
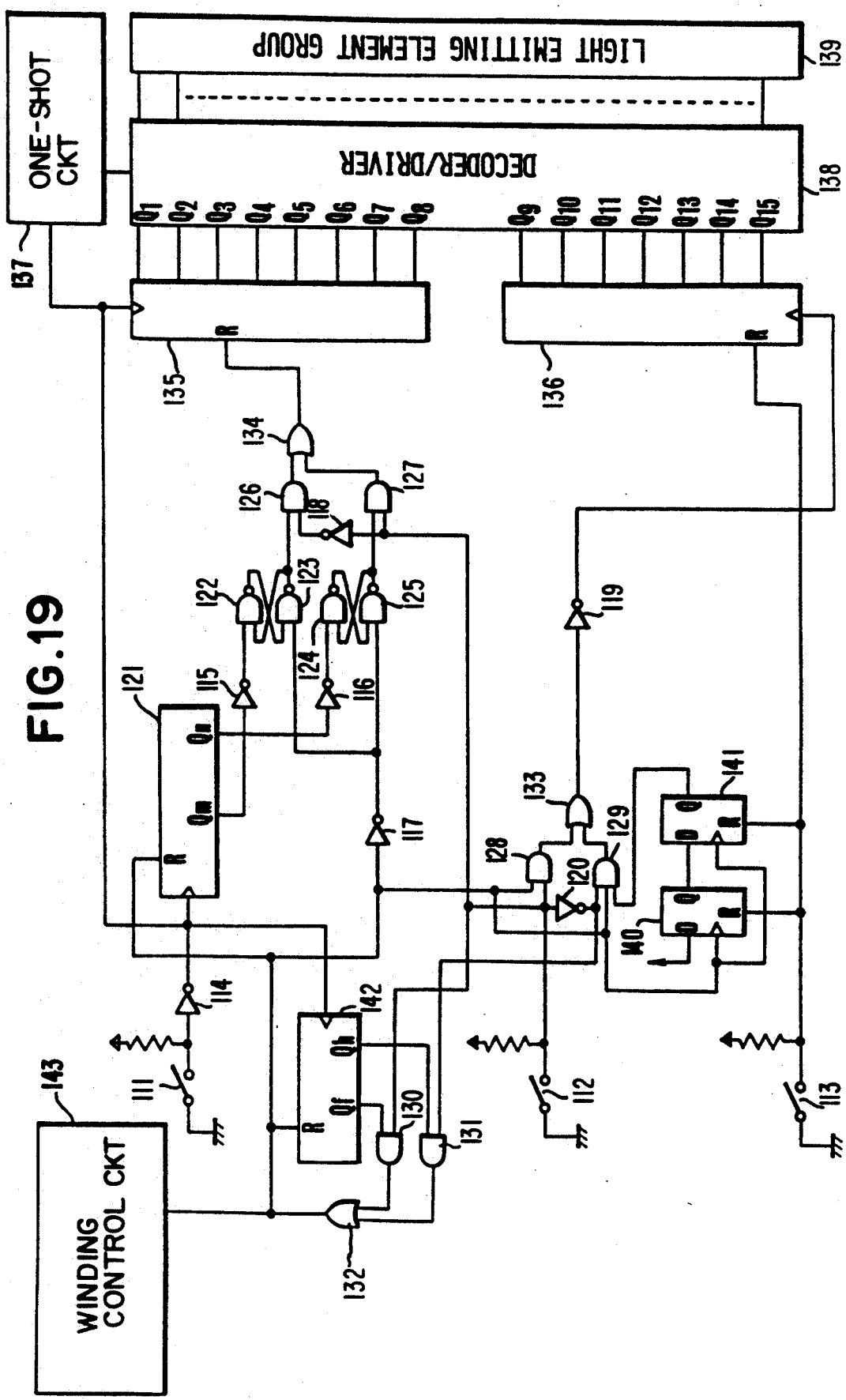
FIG. 19 is a circuit diagram showing a fourth embodiment of this invention which corrects imprinted data position in accordance with the selected photographing image plane.
Figure 23:
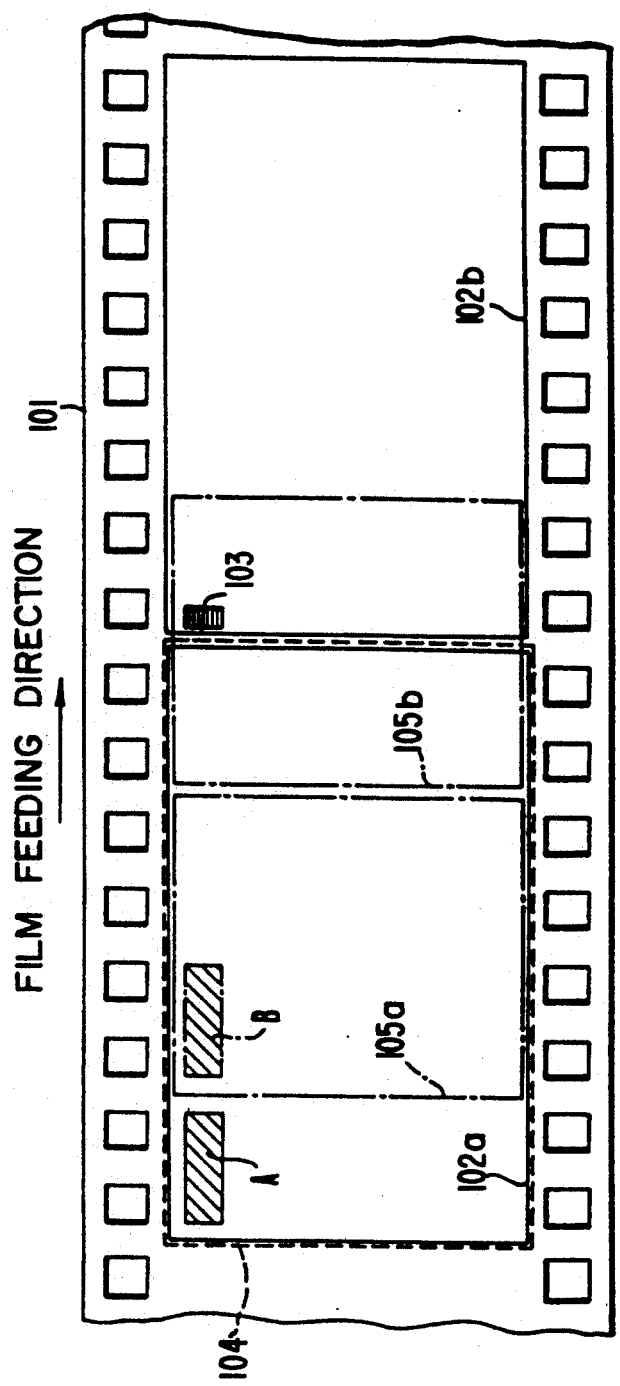
FIG. 23 shows the conventional method of arranging a light emitting element group outside of an aperture to imprint data during feeding of the film, with the method applied to a full-size/half-size selectable camera.

FIG. 19 is a circuit diagram showing a fourth embodiment of the invention which corrects imprinted data position in accordance with the selected photographic mode. The FIG. 19 apparatus is applicable to the type of camera shown in FIG. 23 having the light emitting element group disposed outside of the aperture and is arranged to imprint data during the process of film winding.

Referring to FIG. 19, a sprocket switch 111 is arranged to be turned on or off in synchronism with the movement of the film by means of a rotary encoder or the like which is linked to a sprocket. The switch 111 is thus arranged to permit detection of any movement of the dot pitch between one imprinting data (or a character) which is composed of a dot matrix and another. A full-half mode selection switch 112 is arranged to turn off when the full-size photographic mode is selected and to turn on when the half-size photographic mode is selected. A back cover switch 113 is arranged to turn off when a back cover of the camera opens and to turn on when the back cover closes. The illustration includes inverters 114 to 120. A counter 121 is arranged to determine a length of time between the start of feeding a frame on which data is to be imprinted and the start of imprinting data on the frame, i.e. the light emission timing. Upon arrival of the light emission timing, the counter 121 produces a Qn output at a high level in the full-size photographic mode and a Qm output at a high level in the half-size photographic mode.

NAND gates 122 and 123 form a latch circuit while NAND gates 124 and 125 form another latch circuit. Reference numerals 126 to 131 denote AND gates. Reference numerals 132 to 134 denote OR gates. A counter 135 is arranged to count the number of times the sprocket switch 111 turns on and off and to produce a signal indicative of the one-character-dot intervals of a series of imprinting data. Another counter 136 is arranged to produce a signal for changing the imprinting data for a next frame. A reference numeral 137 denotes a one-shot circuit; a numeral 138 denotes a decoder/driver; a numeral 139 denotes a light emitting element group for data imprinting; and numerals 140 and 141 denote D flip-flops which are operable in the half-size photographic mode. A counter 142 is arranged to count the number of times the sprocket switch 111 turns on and off and, upon arrival of the end of one-frame feeding time, to produce a Qf output at a high level in the full-size photographic mode, and a Qh output (which is less than the Qf output) at a high level in the half-size photographic mode, respectively. A numeral 143 denotes a known film winding control circuit.

This embodiment operates in the following manner:

In case the full-size photographic mode is selected and the mode selection switch 112 is in an off position: Since the switch 112 is off, the inverters 118 and 120 produce low level outputs. As a result, AND gates 127, 128, and 130 are selected. When a film which is not shown is loaded and the back cover is closed, the back cover switch 113 turns on. The D flip-flops 140 and 141 and the counter 136 are released from their reset states. When a frame portion of the film begins to be wound up after completion of photographing on the frame, the sprocket switch 111 repeatedly turns on and off accordingly as the frame is wound up. The signal of the switch 111 is supplied to the counter 121 via the inverter 114. The counter 121 counts the number of times the switch 111 turns on and off. When the level of the Qn output of the counter 121 becomes high with the counted value of the counter 121 having reached a given number, that is, when the counter 121 produces a signal indicating the arrival of the light emission timing for the frame exposed in the full-size photographic mode, the output level of the inverter 116 becomes low. This causes the NAND gates 124 and 125 to produce a latch output at a low level. As a result, the output levels of both the AND gate 127 and the OR gate 134 become low to release the counter 135 from its reset state. The counter 135 then counts the number of times the sprocket switch 111 turns on and off. Then a signal indicative of the one-character-dot intervals of a series of imprinting data for the exposed frame being wound up is supplied to the decoder/driver 138. In accordance with this signal, the data to be imprinted on the exposed frame under the winding process is read out by the decoder/driver 138 from its internal memory during a period of time determined by the one-shot circuit 137. The decoder/driver 138 then drives and controls the light emitting element group 139 to imprint data by the dot matrix in a predetermined position on the exposed frame.

After completion of data imprinting, when the level of the Qf output of the counter 142 which counts the number of on-off times of the sprocket switch 111 becomes high, the output levels of both the AND gate 130 and the OR gate 132 become high. The counter 142, the latch output of the NAND gates 124 and 125 and the counter 121 are reset. Then, the winding control circuit 143 is also reset and the winding process on the exposed frame comes to an end. Further, at that time, both the output level of the AND gate 128 and that of the OR gate 133 momentarily become high. The output level of the inverter 119 momentarily becomes low. This causes the counted value of the counter 136 to be incremented by one. A signal indicative of this is supplied to the decoder/driver 138 to cause it to look up imprinting data for a next frame in the internal memory. Data imprinting thus becomes ready for the next frame.

Next, in case the half-size photographic mode is selected and the mode selection switch 112 is in an on position thereof, the embodiment operates as follows:

Since the mode selection switch 112 is on, the output levels of the inverters 118 and 120 are high to select the AND gates 126, 129 and 131. Then, in the same manner as in the case of the full-size photographic mode, the counter 121 counts the number of times for which the sprocket switch 111 turns on and off. When the level of the Qm output of the counter 121 becomes high, the output level of the inverter 115 becomes low. The level of the latch output of the NAND gates 122 and 123 also becomes low. This causes the output level of the OR gate 134 to become low to release the counter 135 from its reset state. The counter 135 counts the number of times the sprocket switch 111 turns on and off. Then, data is imprinted in the same manner as described above according to the counted value of the counter 135.

After completion of data imprinting, when the level of the Qh output of the counter 142 becomes high, the output levels of both the AND gate 131 and the OR gate 132 become high. The counter 142, the latch output of the NAND gates 122 and 123 and the counter 121 are reset. The winding control circuit 143 is also reset. The winding process on the exposed, data-imprinted frame then comes to an end. Further, a high level input is constantly applied to the D input terminal of the D flip-flop 140. The Q output of the the D flip-flop 140 is caused to become a high level by the first pulse rise of the output of the OR gate 132. The Q output of the other D flip-flop 141 is caused to become a high level by the second pulse rise of the output of the OR gate 132. In other words, when two frames of film are wound up, the output levels of the AND gate 129 and the OR gate 133 momentarily become high and the output level of the inverter 119 momentarily becomes low. This causes the counted value of the counter 136 to be incremented by one. As a result, the imprinting data looked up by the decoder/driver 138 is then shifted to a degree corresponding to one frame. In other words, when the first exposed frame is wound up, the imprinting position of the data for the frame has not reached the position of the light emitting element group 139. Therefore, in the event of the half-size photographic mode, the imprinting data to be looked up by decoder/driver 138 is shifted by one frame. Data imprinting for a currently exposed frame is, therefore, effected during the process of film winding which is performed after completion of a photo-taking action on a next frame.

Figure 20:
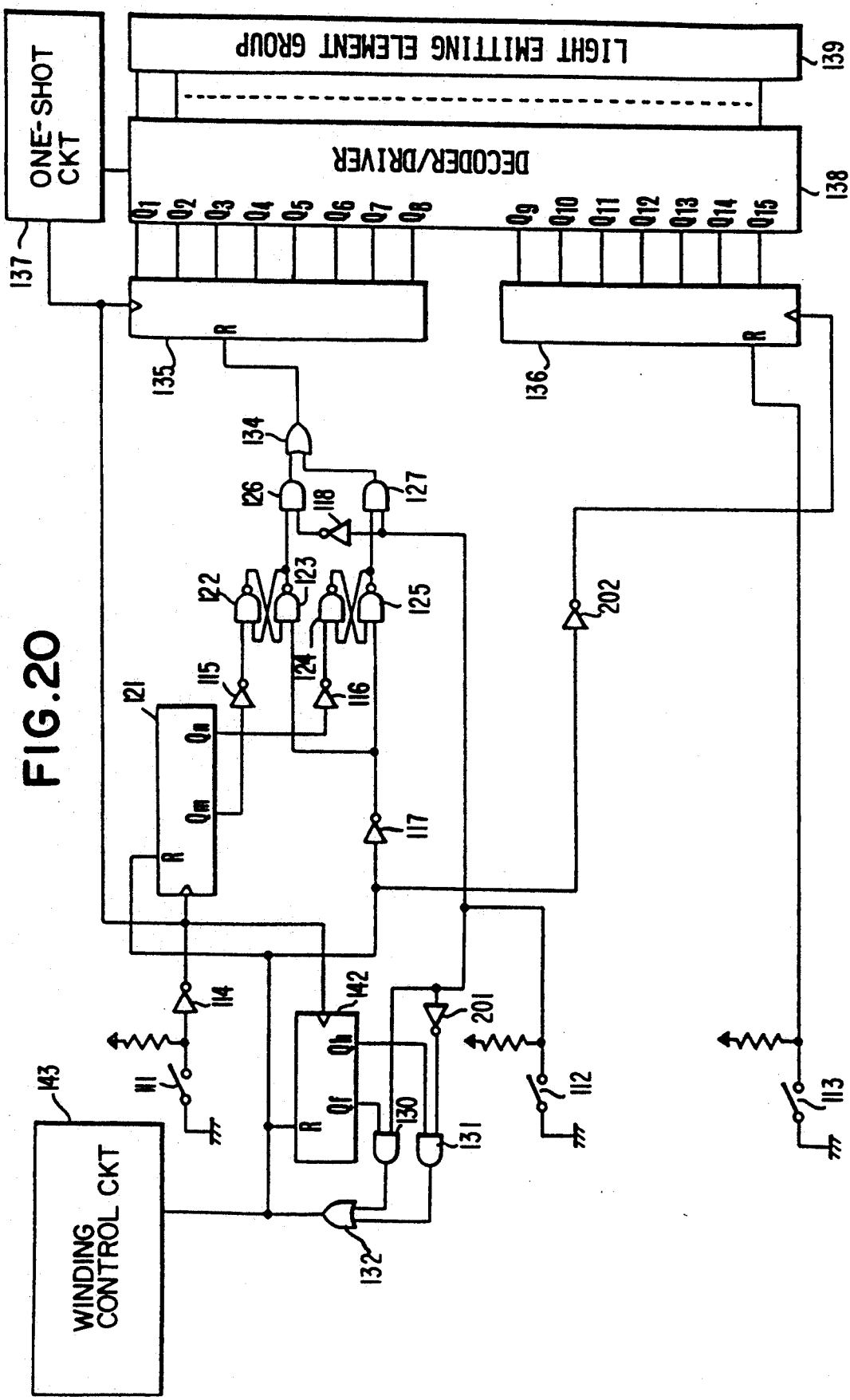
FIG. 20 is a circuit diagram showing a fifth embodiment of the invention which corrects imprinted data position in accordance with the selected photographing image plane.
Figure 24:
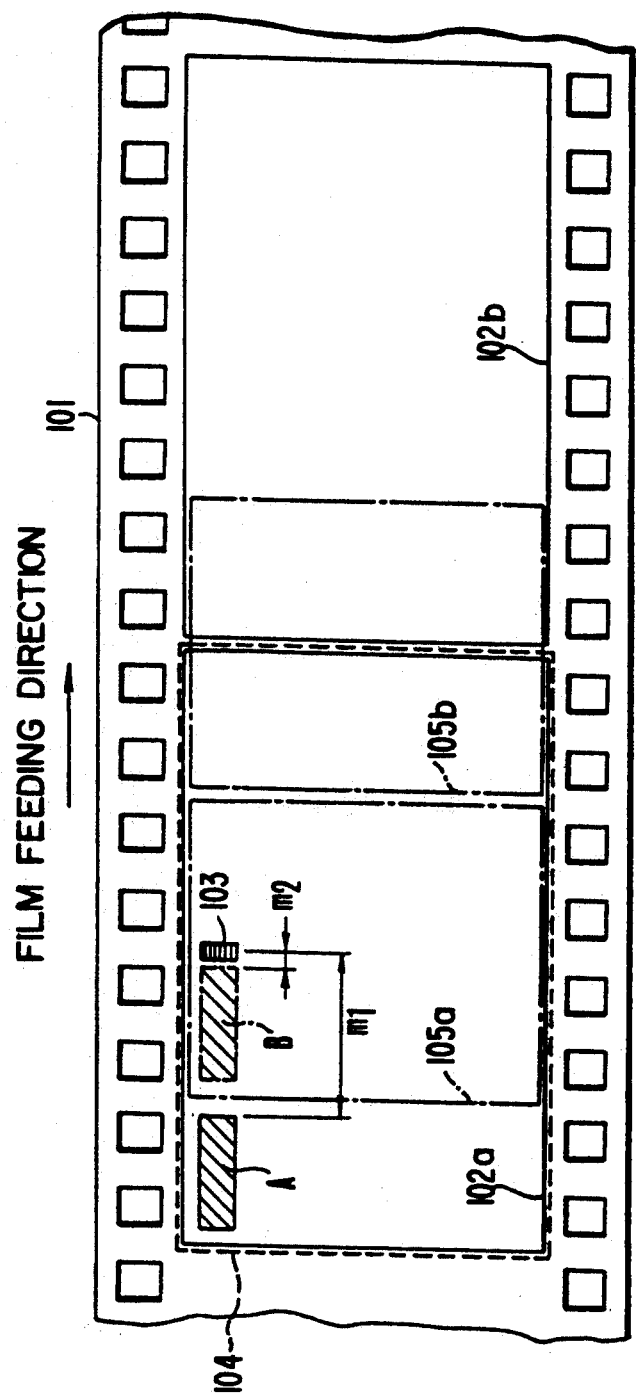
FIG. 24 shows the convention method of arranging the light emitting element group within the aperture to imprint data during feeding of the film, with the method also applied to the full-size/half-size selectable type camera.

FIG. 20 is a circuit diagram showing a fifth embodiment of the invention. In this case, the light emitting element group is disposed within the aperture as shown in FIG. 24. The fifth embodiment is arranged, by way of example, also to perform data imprinting during the process of film winding. In FIG. 20, the same parts as those of FIG. 19 are indicated by the same reference numerals. The fifth embodiment differs from the fourth embodiment in the following point: The imprinting position of the data for a frame first used (exposed) for photographing passes the position of the light emitting element group 139 when this frame is wound up. Therefore, the imprinting data to be readied by the decoder/driver 138 is not shifted to an extent corresponding to one frame. Data imprinting for each frame is thus arranged to be effected without fail before the end of a film winding process performed on the same frame after the photo-taking operation thereon. The operation of the fourth embodiment is as briefly described below:

The OR gate 133, the AND gate 129 and the D flip-flops 140 and 141 of FIG. 19 are not included in the fourth embodiment. Therefore, the counter 136 is arranged to receive one pulse every time the film is wound up by one frame irrespective of selection between the full-size photographic mode and the half-size photographic mode. The one pulse thus applied causes the counted value of the counter 136 to be incremented by one. As a result, the data for the frame being wound up is imprinted by the light emitting element group 139 before the end of the winding process.

Figure 21:
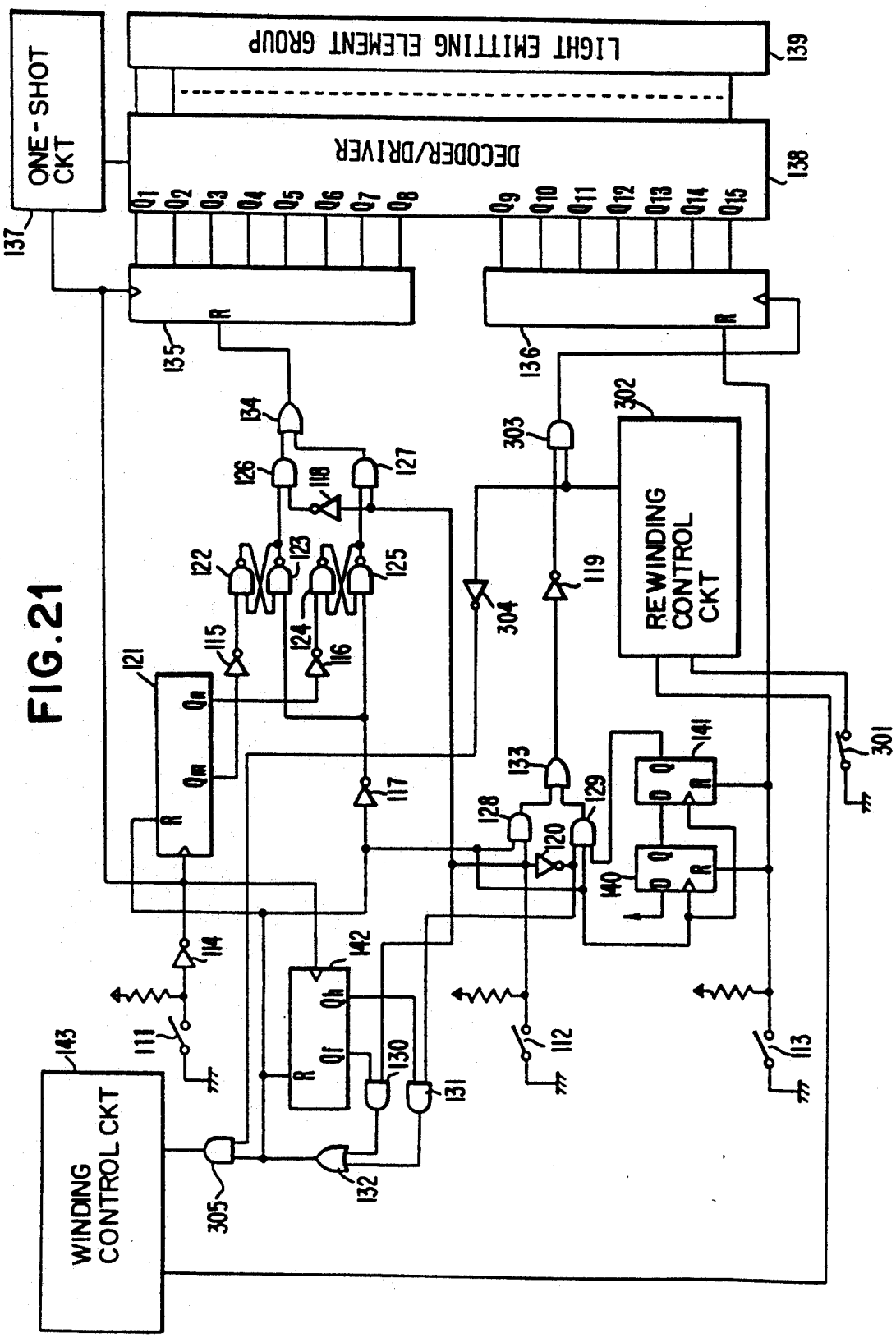
FIG. 21 is a circuit diagram showing a sixth embodiment of the invention which corrects imprinted data position in accordance with the selected photographing image plane.
Figure 22:
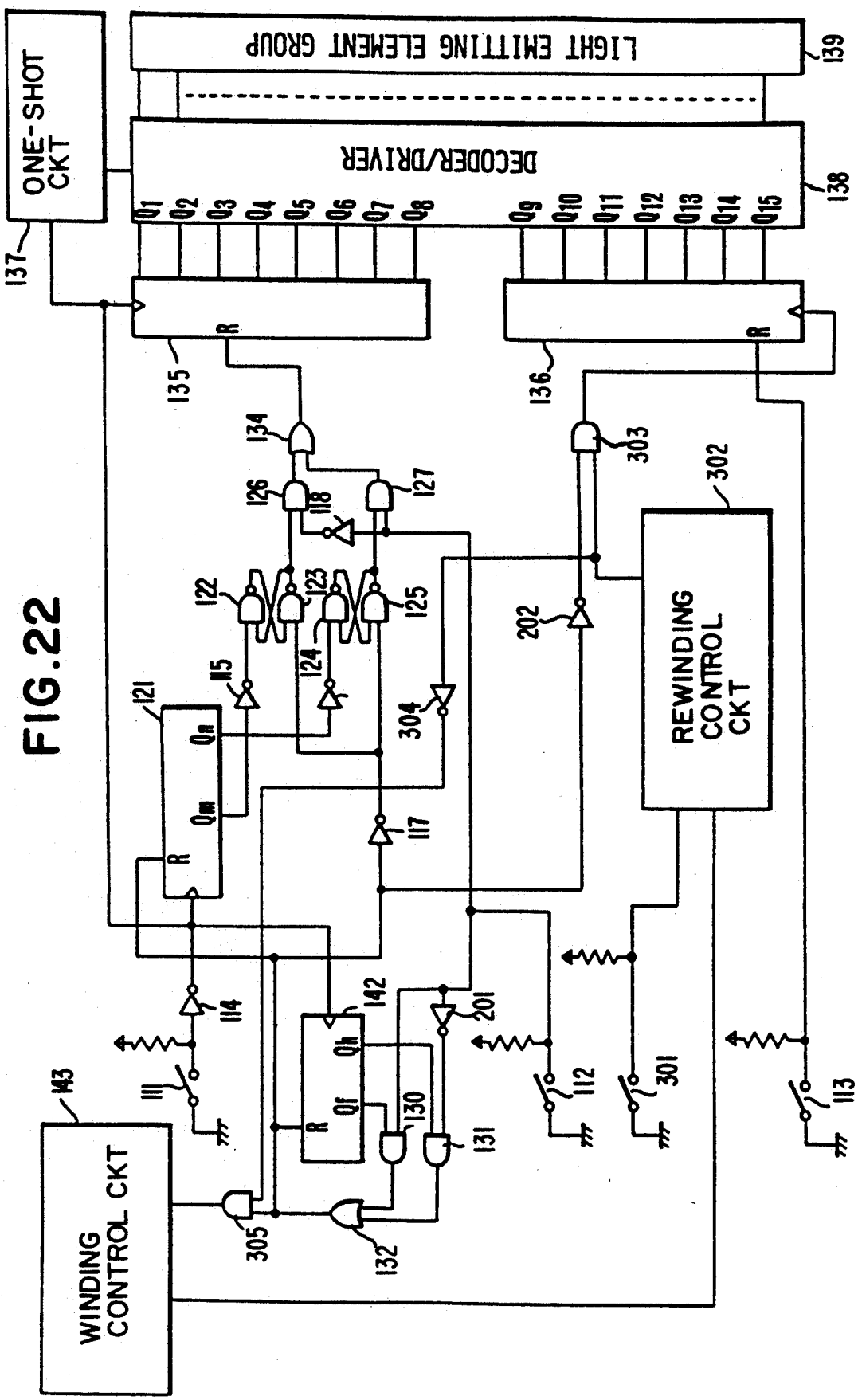
FIG. 22 is a circuit diagram showing a seventh embodiment of the invention which corrects imprinted data position in accordance with the selected photographing image plane.

FIGS. 21 and 22 show sixth and seventh embodiments of the invention, respectively. FIG. 21 corresponds to FIG. 23 and FIG. 22 corresponds to FIG. 24, respectively. Both the sixth and seventh embodiments are arranged, by way of example contrary to the preceding embodiments, to effect data imprinting during the process of film rewinding instead of film winding. Further, in these figures, the same parts as those of FIGS. 19 and 20 are indicated by the same reference numerals. All circuit elements that are necessary for data imprinting during the process of film rewinding are indicated by reference numerals to which 200 is added in distinction from other circuit elements.

Referring to FIGS. 21 and 22, when a predetermined number of frames are wound up and a signal produced from a winding control circuit 143 is supplied to a rewinding control circuit 302, the circuit 302 assumes a film rewinding state and produces a high level signal toward an AND gate 303 and an inverter 304. This causes the output level of the inverter 304 and that of an AND gate 305 to become low respectively. As a result, the winding control circuit signal is not input to the circuit 143. Meanwhile, in the case of FIG. 21, the one-pulse signal from the OR gate 132 is supplied to the counter 136 via the AND gate 128 (in the full-size photographic mode) or the D flip-flops 140 and 141 and the AND gate 129 (in the half-size photographic mode), the OR gate 133 and the inverter 119. In the case of FIG. 22, the one-pulse signal is supplied to the counter 136 via the inverter 209 and the above stated AND gate 303 both in the full- and half-size photographic modes. This causes the counted value of the counter 136 to be incremented by one. Then, a signal indicative of a change of imprinting data is supplied to the decoder/driver 138. The rewinding process is brought to a stop by turning off a film presence/absence detection switch 301 which is arranged to turn on when the film is at the aperture and to turn off when there is no film at the aperture.

With the sixth and seventh embodiments arranged in the manners as described above, they operate as follows: In the case of FIG. 21, data is imprinted during the process of rewinding a next frame immediately after the start thereof following completion of rewinding a first frame in the half-size photographic mode. In the case of the full-size photographic mode of the sixth embodiment and the full- or half-size photographic mode of the seventh embodiment, data is imprinted during the process of rewinding the first frame immediately after the start of the rewinding process on the first frame. After that, data is imprinted on frames one after another every time one frame is rewound.

The embodiments described are arranged such that: In case that the arrangement to imprint data on a moving film by means of light emitting elements such as LEDs is applied to a camera of the kind arranged to permit selection between full- and half-size photographic modes, the light emission timing (a length of time between the start of a winding or rewinding action on a frame on which data is to be imprinted and the start of imprinting the data on the same frame) is variable according to the selection between the full- and half-size photographic modes. This arrangement ensures a correct data imprint in a predetermined position on each film frame irrespectively of the mode selected.

The camera arranged according to the invention as described in the foregoing fourth, fifth, sixth and seventh embodiments comprises in combination photographic mode selection means for selecting one of a full-size photographic mode in which a photo-taking image plane is of a full size and a half-size photographic mode in which the photo-taking image plane is of a half size; and imprint timing changing means for changing a length of time between the start of feeding a frame on which data is to be imprinted and the start of imprinting data on the frame according to the selected photographic mode. The above stated length of time is changed in such a way as to prevent deviation of the data imprinting position obtained in one of the full- and half-size photographic modes from the data imprinting position obtained in the other mode. The data, therefore, can be imprinted correctly in a predetermined position within the image plane irrespective as to whether the full- or half-size mode photographic is selected.

It goes without saying that the first, second, and third embodiments can be combined with the fourth, fifth, sixth, and seventh embodiments. That is, the apparatus according to the present invention can adjust both the size and the position of the imprinted data in accordance with the selected full-size or half-size photographic mode. The person of ordinary skill in this field could easily realize such a device, give the teachings of the above-described embodiments, together with the drawings.

The specific structural details of the devices represented by blocks in the drawings are per se well known or could be readily constructed by the person of ordinary skill in this field without undue experimentation. Therefore, the exact structure of the blocks in the drawings are not described in further detail in order to more clearly describe the present invention, and since such details are not critical to the best mode of carrying out the present invention.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A data imprinting device for a camera capable of varying an exposure area size, comprising:
   a) data imprinting means for imprinting data and also for imprinting the data in different sizes; and
   b) varying means for varying the size of data to be imprinted by said data imprinting means in accordance with the variation of the exposure area size.

2. A device according to claim 1, wherein said exposure area size is varied in accordance with selection of a full or half photographing operation.

3. A device according to claim 1, wherein said data size varying means is adapted to vary the size of the data so that the ratio of the size of data to be imprinted to the exposure area size is substantially constant.

4. A data imprinting device for a camera, comprising:
   data imprinting means for imprinting data; and
   varying means for varying the size of data to be imprinted by said data imprinting means in accordance with a variation of an image field size,
   wherein said data imprinting means includes an imprinting member adapted to be used on a common basis for imprinting the data in different sizes.

5. A device according to claim 4, wherein said imprinting member is provided with a plurality of imprinting elements.

6. A device according to claim 5, wherein said varying means varies the size of data to be imprinted by selecting one or more elements to be used from among said plurality of imprinting elements.

7. A device according to claim 5, wherein said data imprinting means performs an imprinting operation during feeding of a film onto which the data is imprinted, and said varying means varies the size of data to be imprinted by varying an active period of time for said plurality of imprinting elements.

8. A device according to claim 4, wherein said data imprinting means has an optical system for varying the size of data to be imprinted.

9. A device according to claim 8, wherein said varying means varies the size of data to be imprinted by switching said optical system.

10. A data imprinting device for a camera, comprising:
    data imprinting means for imprinting data, said data imprinting means having a plurality of dot-type imprinting elements; and
    varying means for varying the size of data to be imprinted by said data imprinting means in accordance with a variation of an image field size.

11. A device according to claim 10, wherein said varying means varies the size of data to be imprinted by selecting one or more to be used from among said plurality of dot-type imprinting elements.

12. A device according to claim 10, wherein said data imprinting means performs an imprinting operation during feeding of a film onto which the data is imprinted, and said varying means varies the size of data to be imprinted by varying an active period of time for said plurality of dot-type imprinting elements.

13. A device according to claim 10, wherein said data imprinting means has an optical system for varying the size of data to be imprinted.

14. A device according to claim 13, wherein said varying means varies the size of data to be imprinted by switching said optical system.

15. A device according to claim 10, wherein said image field size corresponds to an exposure area size.

16. A data imprinting device for a camera, comprising:
    data imprinting means for imprinting data; and varying means for varying the size of data to be imprinted by said data imprinting means in accordance with a variation of an exposure area size, wherein said data imprinting means includes an imprinting member adapted to be used on a common basis for imprinting data in different sizes.

17. A device according to claim 16, wherein said imprinting member is provided with a plurality of imprinting elements.

18. A device according to claim 16, wherein said varying means varies the size of data to be imprinted by selecting one or more elements to be used from among said plurality of imprinting elements.

19. A device according to claim 16, wherein said data imprinting means performs an imprinting operation during feeding of a film onto which data is imprinted, and said varying means varies the size of data to be imprinted by varying an active period of time for said plurality of imprinting elements.

20. A device according to claim 16, wherein said data imprinting means has an optical system for varying the size of data to be imprinted.

21. A device according to claim 20, wherein said varying means varies the size of data to be imprinted by switching said optical system.

22. A device according to claim 17, wherein said imprinting elements are each of dot-type.

23. A device according to claim 16, wherein said exposure area size is varied in accordance with selection of a full or half photographing operation.

24. A data imprinting device for a camera, comprising:
data imprinting means for imprinting data; and
varying means for varying the size of data to be imprinted by said data imprinting means in accordance with a variation of an image field size, said varying means being adapted to vary the size of the data so that the ratio of the size of the data to be imprinted to the image field size is substantially constant,
wherein said data imprinting means includes an imprinting member adapted to be used on a common basis for imprinting data in different sizes.

25. A device according to claim 24, wherein said imprinting member is provided with a plurality of imprinting elements.

26. A device according to claim 25, wherein said varying means varies the size of data to be imprinted by selecting one or more elements to be used from among said plurality of imprinting elements.

27. A device according to claim 25, wherein said data imprinting means performs an imprinting operation during feeding of a film onto which the data is imprinted, and said varying means varies the size of data to be imprinted by varying an active period of time for said plurality of imprinting elements.

28. A device according to claim 24, wherein said data imprinting means has an optical system for varying the size of data to be imprinted.

29. A device according to claim 28, wherein said varying means varies the size of data to be imprinted by means of switching said optical system.

30. A device according to claim 24, wherein said image field size corresponds to an exposure area size.

31. A data imprinting device for a camera, comprising:
data imprinting means for imprinting data; and
varying means for automatically changing the data imprinting position of said data imprinting means in accordance with a variation of a photographing image field size,
wherein said data imprinting means includes an imprinting member adapted to be used on a common basis for imprinting data in different positions.

32. A device according to claim 31, wherein said image field size corresponds to an exposure area size.

33. A device according to claim 31, wherein said data imprinting means performs an imprinting operation during feeding of a film onto which the data is imprinted, and said varying means changes the data imprinting position by means of varying a timing of data imprinting.

34. A device according to claim 33, wherein said varying means changes the data imprinting position by varying a period of time from a film feed start to a data imprinting operation start.

35. A data imprinting device for a camera having an exposure area size varying means, comprising:
data imprinting means for imprinting data; and
varying means for automatically changing the data imprinting position of said data imprinting means in accordance with the exposure area size varied by said exposure area size varying means.

36. A device according to claim 35, wherein said data imprinting means includes an imprinting member adapted to be used on a common basis for imprinting data in different positions and performs an imprinting operation during feeding of a film onto which the data is imprinted, and said varying means changes the data imprinting position by varying a timing of data imprinting.

37. A device according to claim 36, wherein said varying means changes the data imprinting position by varying a period of time from a film feed start to a data imprinting operation start.

38. A data imprinting device for a camera, comprising:
data imprinting means for imprinting data;
indication means for indicating an image field size; and
varying means for automatically changing the size of imprinting data of said data imprinting means,
wherein said data imprinting means includes an imprinting member adapted to be used on a common basis for imprinting data in different sizes.

39. A device according to claim 38, wherein said indication means comprises a switch member for selecting an image field.

40. A device according to claim 38, wherein said image field size corresponds to an exposure area size.

41. A data imprinting device for a camera, comprising:
data imprinting means for imprinting data;
indication means for instructing said device to maintain the ratio of an image field size at the time of printing to the size of the data imprinted by said data imprinting means unchanged; and
varying means for automatically changing the size of imprinting data of said data imprinting means in response to an indication from said indication means,
wherein said data imprinting means includes an imprinting member adapted to be used on a common basis for imprinting data in different sizes.

42. A device according to claim 41, wherein said indication means comprises a switch member for selecting the image field size.

43. A data imprinting device for a camera, comprising:
data imprinting means for imprinting data;
indication means for indicating an image field size; and
varying means for automatically changing the position of imprinting data of said data imprinting means,
wherein said data imprinting means includes an imprinting member adapted to be used on a common basis for imprinting data in different positions.

44. A device according to claim 43, wherein said image field size corresponds to an exposure area size.

45. A data imprinting device for a camera, comprising:
a) indication means for indicating a size of an exposure area; and
b) varying means for automatically changing the size of data to be imprinted in an image field.

46. A data imprinting device for a camera, comprising:
a) indication means for indicating a size of an exposure area; and
b) varying means for automatically changing a position of data to be imprinted in an image field.

47. A data imprinting device for a camera, comprising:
data imprinting means for imprinting data on a film;
detecting means for detecting a selected image field size; and
varying means for automatically varying the size of data to be imprinted on the film in accordance with an image field size detected by said detecting means,
wherein said data imprinting means includes an imprinting member adapted to be used on a common basis for imprinting data in different sizes.

48. A data imprinting device for a camera, comprising:
data imprinting means for an imprinting data on a film;
detecting means for detecting a selected image field size; and
varying means for automatically varying the position of data to be imprinted on the film in accordance with an image field size detected by said detecting means,
wherein said data imprinting means includes an imprinting member adapted to be used on a common basis for imprinting data in different positions.

49. A camera arranged to permit an exposure area to be selected, comprising:
a camera housing;
data imprinting means for imprinting data and also for imprinting the data in different sizes; and
varying means for varying the size of data to be imprinted by said data imprinting means in accordance with a variation of a size of the exposure area,
wherein said data imprinting means and said varying means are supported by said camera housing.

50. A camera according to claim 49, wherein said data size varying means is adapted to varying the size of the data so that the ratio of the size of data to be imprinted to the size of the exposure area is substantially constant.

51. A camera, comprising:
a camera housing;
data imprinting means for imprinting data;
varying means for varying the size of data to be imprinted by said data imprinting means in accordance with a variation of an image field size,
wherein said data imprinting means includes an imprinting member adapted to be used on a common basis for imprinting data in different sizes, and
wherein said data imprinting means and said varying means are supported by said camera housing.

52. A camera according to claim 51, wherein said imprinting member is provided with a plurality of imprinting elements.

53. A camera according to claim 52, wherein said varying means varies the size of data to be imprinted by selecting one or more elements to be used from among said plurality of imprinting elements.

54. A camera according to claim 52, wherein said data imprinting means performs an imprinting operation during feeding of a film onto which data is imprinted, and said varying means varies the size of data to be imprinted by varying an active period of time for said plurality of imprinting elements.

55. A camera according to claim 52, wherein said data imprinting means has an optical system for varying the size of data to be imprinted.

56. A camera, comprising:
a camera housing;
data imprinting means for imprinting data, said data imprinting means having a plurality of dot-type imprinting elements; and
varying means for varying the size of data to be imprinted by said data imprinting means in accordance with a variation of an image field size,
wherein said data imprinting means and said varying means are supported by said camera housing.

57. A camera according to claim 56, wherein said varying means varies the size of data to be imprinted by means of selecting any element to be used from among said plurality of dot-type imprinting elements.

58. A camera according to claim 56, wherein said data imprinting means performs an imprinting operation during feeding of a film onto which data is imprinted, and said varying means varies the size of data to be imprinted by varying an active period of time for said plurality of dot-type imprinting elements.

59. A camera according to claim 56, wherein said data imprinting means has an optical system for varying the size of data to be imprinted, and said varying means varies the size of data to be imprinted by switching said optical system.

60. A camera, comprising:
a camera housing;
data imprinting means for imprinting data; and
varying means for varying the size of data to be imprinted by said data imprinting means in accordance with a variation of an image field size, said varying means being adapted to vary the size of the data so that the ratio of the size of data to be imprinted to the image field size is substantially constant,
wherein said data imprinting means includes an imprinting member adapted to be used on a common basis for imprinting data in different sizes, and wherein said data imprinting means and said varying means are supported by said camera housing.

61. A camera according to claim 60, wherein said varying means varies the size of data to be imprinted by selecting one or more elements to be used from among said plurality of imprinting elements.

62. A camera according to claim 60, wherein said data imprinting means performs an imprinting operation during feeding of a film onto which data is imprinted, and said varying means varies the size of data to be imprinted by varying an active period of time for said plurality of imprinting elements.

63. A camera according to claim 60, wherein said data imprinting means has an optical system for varying the size of data to be imprinted.

64. A camera, comprising:
a camera housing;
data imprinting means for imprinting data; and
varying means for automatically changing the data imprinting position of said data imprinting means in accordance with a variation of a photographing image field size,
wherein said data imprinting means includes an imprinting member adapted to be used on a common basis for imprinting the data in different sizes, and
wherein said data imprinting means and said varying means are supported by said camera housing.

65. A camera arranged to permit an exposure area to be selected, comprising:
a camera housing;
data imprinting means for imprinting data; and
varying means for automatically changing the data imprinting position of said data imprinting means in accordance with a variation of a size of the exposure area,
wherein said data imprinting means and said varying means are supported by said camera housing.

66. A camera according to claim 65, wherein said data imprinting means includes an imprinting member adapted to be used on a common basis for imprinting the data in different positions, and
wherein said data imprinting means performs an imprinting operation during feeding of a film onto which the data is imprinted, and said varying means changes the data imprinting position by varying a timing of data imprinting.

67. A camera, comprising:
a camera housing;
data imprinting means for imprinting data;
indication means for indicating an image field size; and
varying means for automatically changing the size of imprinting data of said data imprinting means,
wherein said data imprinting means includes an imprinting member adapted to be used on a common basis for imprinting the data in different sizes, and
wherein said data imprinting means and said varying means are supported by said camera housing.

68. A camera, comprising:
a camera housing;
data imprinting means for imprinting data;
indication means for instructing said device to maintain the ratio of an image field size at the time of printing to the size of the data imprinted by said data imprinting means unchanged; and
varying means for automatically changing the size of imprinting data of said data imprinting means in response to an indication from said indication means,
wherein said data imprinting means includes an imprinting member adapted to be used on a common basis for imprinting the data in different sizes, and
wherein said data imprinting means and said varying means are supported by said camera housing.

69. A camera, comprising:
a camera housing;
data imprinting means for imprinting data;
indication means for indicating an image field size; and
varying means for automatically changing the position of imprinting data of said data imprinting means,
wherein said data imprinting means includes an imprinting member adapted to be used on a common basis for imprinting the data in different positions, and
wherein said data imprinting means and said varying means are supported by said camera housing.

70. A camera, comprising:
a camera housing;
indication means for indicating a size of an exposure area; and
varying means for automatically changing the size of data to be imprinted in an image field,
wherein said data imprinting means and said varying means are supported by said camera housing.

71. A camera, comprising:
a camera housing;
indication means for indicating a size of an exposure area; and
varying means for automatically changing a position of data to be imprinted in an image field,
wherein said data imprinting means and said varying means are supported by said camera housing.

72. A camera, comprising:
a camera housing;
data imprinting means for imprinting data on a film;
detecting means for detecting a selected image field size; and
varying means for automatically varying the size of data to be imprinted on the film in accordance with an image field size detected by said detecting means,
wherein said data imprinting means includes an imprinting member adapted to be used on a common basis for imprinting data in different sizes, and
wherein said data imprinting means and said varying means are supported by said camera housing.

73. A camera, comprising:
a camera housing;
data imprinting means for imprinting data on a film;
detecting means for detecting a selected image field size; and
varying means for automatically varying the position of the data to be imprinted on the film in accordance with an image field size detected by said detecting means,
wherein said data imprinting means includes an imprinting member adapted to be used on a common basis for imprinting the data in different positions, and
wherein said data imprinting means and said varying means are supported by said camera housing.

74. A data recording device for an optical apparatus, comprising:

data recording means for recording data; and varying means for varying the size of data to be recorded by said data recording means in accordance with a variation of an image recording means in accordance with a variation of an image field size.

wherein said data recording means includes a recording member adapted to be used on a common basis for recording the data in different sizes.

75. A data recording device for a camera, comprising:

data recording means for recording data; and varying means for varying the size of data to be recorded by said data recording means in accordance with a variation of an image field size, said varying means being adapted to vary the size of the data so that the ratio of the size of the data to be recorded to the image field size is substantially constant, wherein said data recording means includes a recording member adapted to be used on a common basis for recording the data in different sizes.

76. A data recording device for a camera, comprising:

data recording means for recording data; and varying means for automatically changing the data recording position of said data recording means in accordance with a variation of a photographing image field size, wherein said data recording means includes a recording member adapted to be used on a common basis for recording the data in different positions.

77. A data recording device for a camera, comprising:

data recording means for recording data;

indication means for indicating an image field size; and varying means for automatically changing the size of recording data of said data recording means, wherein said data recording means includes a recording member adapted to be used on a common basis for recording the data in different sizes.

78. A data recording device for a camera, comprising:

data recording means for recording data;

indication means for instructing said device to maintain the ratio of an image field size at the time of printing to the size of data recorded by said data recording means unchanged; and varying means for automatically changing the size of recording data of said data recording means in response to an indication from said indication means, wherein said data recording means includes a recording member adapted to be used on a common basis for recording the data in different sizes.

79. A data recording device for a camera, comprising:

data recording means for recording data;

indication means for indicating an image field size; and varying means for automatically changing the position of recording data of said data recording means, wherein said data recording means includes a recording member adapted to be used on a common basis for recording the data in different positions.

80. A data recording device for a camera, comprising:

data recording means for recording data on a storage medium;

detecting means for detecting a selected image field size; and varying means for automatically varying the size of data to be recorded on the storage medium in accordance with an image field size detected by said detecting means, wherein said data recording means includes a recording member adapted to be used on a common basis for recording the data in different sizes.

81. A data recording device for a camera, comprising:

data recording means for recording data on a storage medium;

detecting means for detecting a selected image field size; and varying means for automatically varying the position of data to be recorded on the storage medium in accordance with an image field size detected by said detecting means, wherein said data recording means includes a recording member adapted to be used on a common basis for recording the data in different positions.

82. A camera, comprising:

data recording means for recording data; and control means for providing such a control that the ratio of an amount of data to be recorded by said data recording means to a size of an area to be used in an available area of an image recording medium is substantially constant in accordance with a variation of the size of area to be used, wherein said data recording means includes a recording member adapted to be used on a common basis for recording the data on different areas to be used.

83. An image recording apparatus, comprising:

data recording means for recording data; and control means for providing such a control that the ratio of an amount of data to be recorded by said data recording means to a size of an area to be used in an available area of an image recording medium is substantially constant in accordance with a variation of the size of area to be used, wherein said data recording means includes a recording member adapted to be used on a common basis for recording the data on different areas to be used.

* * * * *

UNITED STATES PATENT AND TRADEMARK OFFICE
CERTIFICATE OF CORRECTION

PATENT NO. : 5,245,373
DATED : September 14, 1993
INVENTOR(S) : YUKIO OGAWA, ET AL.

It is certified that error appears in the above-indentified patent and that said Letters Patent is hereby corrected as shown below:

Drawings:
SHEET 15

FIGURE 22:

"  " should read -- 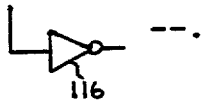 --.

COLUMN 5:

line 49, "length" should read --length $\ell$--.
  line 52, "area" Z x w" should read --area $\ell$ x w--.

COLUMN 7:

line 34, "terminal" should read --terminals--.

COLUMN 12:

line 5, "terminals A0 to A7" should read --terminals A0 to A6--.
  line 10, "terminals A0 to A7" should read --terminals A0 to A6--.

COLUMN 16:

line 49, "inverter 209" should read --inverter--.

UNITED STATES PATENT AND TRADEMARK OFFICE
CERTIFICATE OF CORRECTION

PATENT NO. : 5,245,373
DATED : September 14, 1993
INVENTOR(S) : YUKIO OGAWA, ET AL.

It is certified that error appears in the above-indentified patent and that said Letters Patent is hereby corrected as shown below:

COLUMN 17:

line 34, "mode photographic" should read --photographic mode--.
line 43, "give" should read --given--.
line 52, "and" should be deleted.

COLUMN 21:

line 43, "an" should be deleted.

COLUMN 25:

line 4, "an image recording means in" should be deleted.
line 5, "accordance with a variation of" should be deleted; and "size." should read --size,--.
line 22, "and varying" should read --and ¶ varying--.
line 51, "member" should read --means--.

Signed and Sealed this

Eleventh Day of July, 1995

BRUCE LEHMAN

*Attest:*

*Attesting Officer*     *Commissioner of Patents and Trademarks*